United States Patent
Nagano et al.

(10) Patent No.: US 10,235,967 B2
(45) Date of Patent: Mar. 19, 2019

(54) INFORMATION PROCESSING DEVICE AND INFORMATION PROCESSING METHOD

(71) Applicant: SONY CORPORATION, Tokyo (JP)

(72) Inventors: Kae Nagano, Tokyo (JP); Yusuke Sakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 15/112,771

(22) PCT Filed: Mar. 12, 2015

(86) PCT No.: PCT/JP2015/057324
§ 371 (c)(1),
(2) Date: Jul. 20, 2016

(87) PCT Pub. No.: WO2015/163030
PCT Pub. Date: Oct. 29, 2015

(65) Prior Publication Data
US 2017/0169794 A1    Jun. 15, 2017

(30) Foreign Application Priority Data

Apr. 21, 2014  (JP) ................. 2014-087150

(51) Int. Cl.
| | |
|---|---|
| *G09G 5/00* | (2006.01) |
| *G09G 5/10* | (2006.01) |
| *G09G 5/14* | (2006.01) |
| *H05B 37/02* | (2006.01) |
| *G06F 3/01* | (2006.01) |

(Continued)

(52) U.S. Cl.
CPC ............. *G09G 5/10* (2013.01); *G06F 3/011* (2013.01); *G06F 3/013* (2013.01); *G09G 5/14* (2013.01); *H05B 33/086* (2013.01); *H05B 37/029* (2013.01); *H05B 37/0227* (2013.01); *G09G 2320/0686* (2013.01); *G09G 2354/00* (2013.01); *H04N 5/57* (2013.01)

(58) Field of Classification Search
CPC .... G09G 5/10; G09G 5/14; G09G 2320/0686; G09G 2354/00; H05B 37/0227; H04N 5/57
See application file for complete search history.

(56) References Cited

U.S. PATENT DOCUMENTS

| | | | |
|---|---|---|---|
| 9,615,054 B1 * | 4/2017 | McNelley | H04N 7/144 |
| 2006/0087245 A1 * | 4/2006 | Ng | G06F 1/1615 |
| | | | 315/149 |

(Continued)

FOREIGN PATENT DOCUMENTS

| | | |
|---|---|---|
| JP | 2005-251508 A | 9/2005 |
| JP | 2007-220651 A | 8/2007 |

(Continued)

*Primary Examiner* — Adam R. Giesy
(74) *Attorney, Agent, or Firm* — Chip Law Group

(57) ABSTRACT

To provide a more pleasant use sensation to users.
Provided is an information processing device including: a user information acquisition unit configured to acquire user information based on a state of a user who views a display region; and a light emission control unit configured to control light emission of a light emission control region around a content display region that is a region in which content is displayed within the display region based on the user information.

19 Claims, 17 Drawing Sheets

(51) Int. Cl.
*H05B 33/08* (2006.01)
*H04N 5/57* (2006.01)

(56) References Cited

U.S. PATENT DOCUMENTS

2011/0142413 A1* 6/2011 Kang .................... A61B 5/165
  386/234
2012/0259392 A1* 10/2012 Feng .................... A61N 5/0618
  607/88
2017/0163937 A1* 6/2017 McNelley ................ H04N 7/15

FOREIGN PATENT DOCUMENTS

| JP | 2007-227107 A | 9/2007 |
| JP | 2013-513830 A | 4/2013 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/057324 filed on Mar. 12, 2015, which claims priority benefit of Japanese Patent Application No. 2014-087150 filed in the Japan Patent Office on Apr. 21, 2014. Each of the above-referenced applications is hereby incorporated herein by reference in its entirety.

TECHNICAL FIELD

The present disclosure relates to an information processing device, an information processing method and a program.

BACKGROUND ART

In recent years, relatively large display devices have become popular in general homes. Various techniques have been developed to provide more realistic viewing experiences to users with such large display devices. For example, Patent Literature 1 discloses a technique in which, in a so-called home theater environment including a large display device, color information of content that is displayed on the display device is analyzed, lightings arranged around the display device are controlled in linkage with a change of the color information, and a video with a more spacious sensation is provided to users.

CITATION LIST

Patent Literature

Patent Literature 1 JP2005-251508A

SUMMARY OF INVENTION

Technical Problem

However, in recent years, methods of using the above large display devices have become diverse. For example, in addition to viewing video content such as a movie, a case in which a display device is connected to an information processing device such as a personal computer (PC), and displays (for example, a Web browser and an E-book) according to various types of applications performed in the information processing device are displayed on the display device is considered. In addition, a use case in which a display region of a display device is divided into a plurality of regions and different types of content are displayed in the regions is considered. In the technique disclosed in Patent Literature 1, when a user views video content, only adjustment of the surrounding environment is considered for the purpose of providing a realistic sensation for the user, but there was not sufficient study in consideration of such various use cases.

In view of the above-described circumstances, a technique through which it is possible to provide a more pleasant use sensation to users even if more various use cases are performed in a display system including a large display device is necessary. Therefore, the present disclosure proposes an information processing device, an information processing method and a program which are novel and improved and through which it is possible to provide a more pleasant use sensation to users.

Solution to Problem

According to the present disclosure, there is provided an information processing device including: a user information acquisition unit configured to acquire user information based on a state of a user who views a display region; and a light emission control unit configured to control light emission of a light emission control region around a content display region that is a region in which content is displayed within the display region based on the user information.

According to the present disclosure, there is provided an information processing method including: acquiring, by a processor, user information based on a state of a user who views a display region; and controlling, by a processor, light emission of a light emission control region around a content display region that is a region in which content is displayed within the display region based on the user information.

According to the present disclosure, there is provided a program causing a processor of a computer to execute: a function of acquiring user information based on a state of a user who views a display region; and a function of controlling light emission of a light emission control region around a content display region that is a region in which content is displayed within the display region based on the user information.

According to the present disclosure, user information indicating a state of a user who views a display region is acquired. Then, based on the user information, light emission of a light emission control region around a content display region is controlled. Therefore, light emission of a region around the content display region is controlled according to the state of the user, and a more pleasant use sensation is provided to the user.

Advantageous Effects of Invention

According to the present disclosure described above, it is possible to provide a more pleasant use sensation to users. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Figure 1:
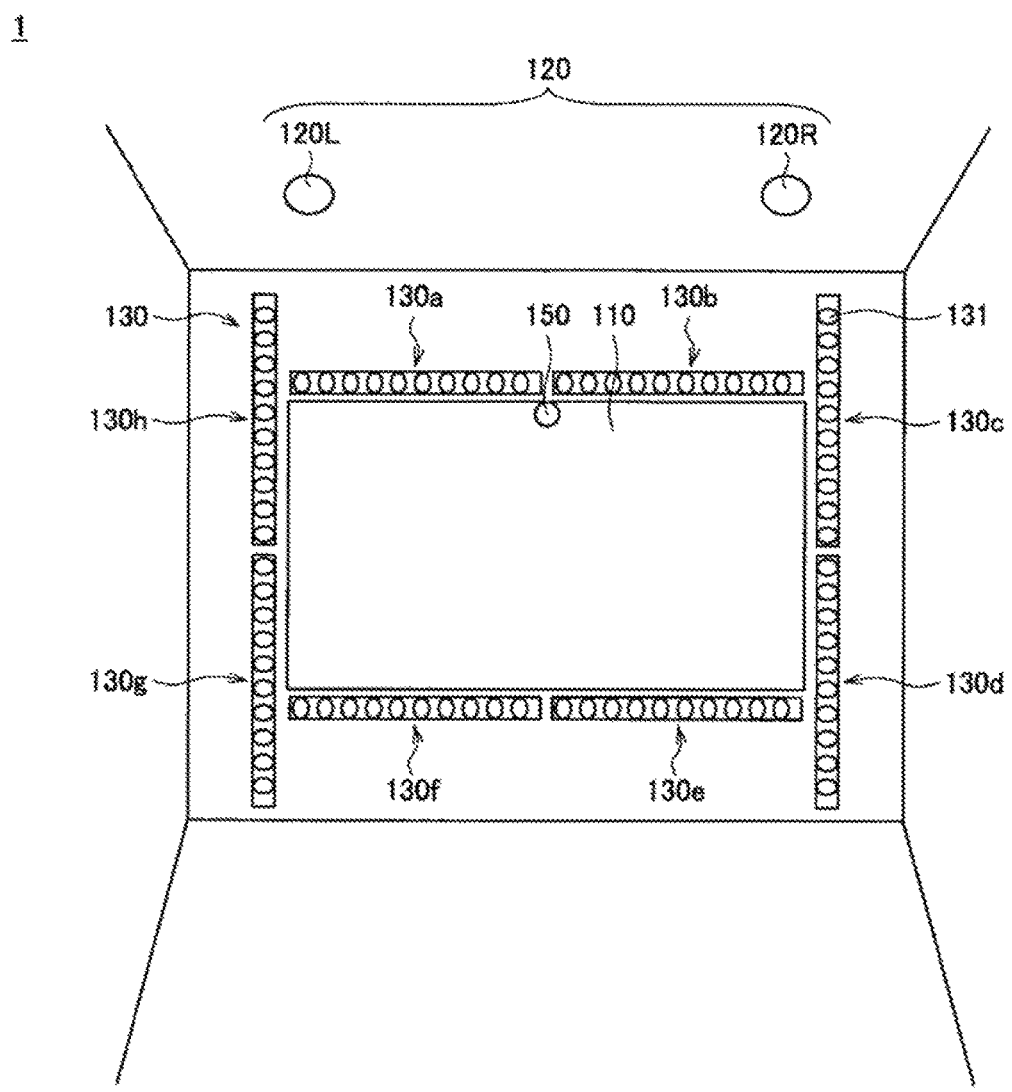
FIG. 1 is a schematic diagram showing an example of an overall configuration of a display system according to the present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. System configuration
1-1. Overall configuration
1-2. Overview of a light emission control process
1-3. Functional configuration
2. Information processing method
3. Viewing region specifying process
4. Light emission control region setting process
5. Light emission control pattern setting process
6. Focus determination process
7. Light emission control adjustment process
8. Hardware configuration
9. Supplement First, in (1. System configuration), a configuration of a display system according to an embodiment of the present disclosure will be described, and an overview of light emission control performed in the display system will be described. Next, in (2. Information processing method), an information processing method performed in the display system according to the present embodiment will be described. Next, in (3. Viewing region specifying process), (4. Light emission control region setting process), (5. Light emission control pattern setting process), (6. Focus determination process) and (7. Light emission control adjustment process), several processes performed in the information processing method according to the present embodiment will be described in further detail. Next, in (8. Hardware configuration), a hardware configuration of the display system according to the present embodiment will be described. Finally, in (9. Supplement), supplementary notes of the present disclosure will be described.

(1. System Configuration)

(1-1. Overall Configuration)

First, an example of an overall configuration of a display system according to an embodiment of the present disclosure will be described with reference to FIG. 1. FIG. 1 is a schematic diagram showing an example of an overall configuration of a display system according to the present embodiment. In this specification, the system may refer to a configuration for performing a predetermined process, a whole system can be considered as one device, and a system can be considered to include a plurality of devices. The display system according to the present embodiment shown in FIG. 1 may be configured to perform a predetermined process (for example, a process shown in a functional configuration of FIG. 3) as a whole display system, and any configuration in the display system may be arbitrarily considered as one device. In the following description, the display system according to the present embodiment will be referred to as a video display device.

As shown in FIG. 1, the display system 1 according to the present embodiment includes a display device 110, an indoor lighting 120 that is disposed above the display device 110, an ambient lighting 130 that is disposed to surround a periphery of the display device 110, and an imaging device 150 that is disposed to be able to image a user who observes the display device 110.

The display device 110 includes a relatively large (for example, 80 inches or more) display screen, and is disposed on a wall surface with the display screen facing the inside of a room. The display device 110 is movable in a vertical direction along with the ambient lighting 130 (the ambient lightings 130a, 130b, 130e, and 130f) that is provided on the wall surface above and below the display device 110. The user can adjust a height of the display device 110 according to an environment in which the display system 1 is used. A type of the display device 110 is not limited. As the display device 110, various types of display devices, for example, a liquid crystal display (LCD) and an organic electro-luminescence (EL) display, may be applied.

In the present embodiment, since control of a display on the display screen of the display device 110 is mainly performed, in FIG. 1 and the drawings to be described below, for simplicity of illustration, only the display screen (a display region) of the display device 110 is schematically shown, and other configurations (for example, a configuration corresponding to a frame (a bezel)) of the display device 110 are not shown. In the following description, for convenience of description, the display screen (a display region) of the display device 110 is denoted with the same reference sign as the display device 110 and is also referred to as a display region 110.

Various types of content are displayed in the display region 110 under control of a display control unit 343 (shown in FIG. 3) to be described below. For example, content that is displayed in the display region 110 may be any type of content, for example, video content such as a movie, content including a still image, content including text (for example, a news site or an E-book), etc. The display region 110 may be connected to an information processing device such as a PC, and serve as a display of the information processing device, and a display according to various types of applications performed in the information processing device may be displayed in the display region 110. In addition, the display region 110 is divided into a plurality of regions, and different types of content may be displayed in the regions. A region in which each type of content is displayed is referred to as a content display region below. In the present embodiment, a use case in which the content display region is preferably set to be smaller than the display region 110 and a plurality of users refer to a plurality of content display regions may be assumed.

In the present embodiment, the display region 110 may not necessarily be implemented by the display screen of the display device 110. In the present embodiment, the display region 110 may be a region in which various types of content can be displayed and may be implemented by other configurations. For example, content is projected to a screen through a projector and thus the display region 110 may be formed on the screen. Alternatively, the display region 110 may be implemented as a combination of different display devices. For example, second content is projected to a predetermined region including the display screen of the display device 110 on which first content is displayed through the projector, and thus the display region 110 may be configured as a region in which the first and second content may be displayed in combination.

Here, the present embodiment will be described below with vertical and horizontal directions defined with respect to a direction toward the display region 110, that is, with respect to a user who observes the display region 110. In addition, a side on which information is displayed in the display region 110 (that is, a side on which the user may be positioned) is referred to as a front side, and an opposite side thereof (that is, a wall surface side on which the display region 110 is provided) is referred to as a rear side.

The indoor lighting 120 is provided above the display region 110 and illuminates at least a predetermined range of the front side of the display region 110. Driving of the indoor lighting 120 is controlled under control of a light emission control unit 345 (shown in FIG. 3) to be described below. The indoor lighting 120 can set a color and brightness of light emission to any value. In addition, the indoor lighting 120 may have directivity, and can set a direction in which light is emitted to any direction. When driving of the indoor lighting 120 is appropriately controlled, an environment around the display region 110, and particularly a light environment of a predetermined region in front of the display region 110, is adjusted.

Figure 2:
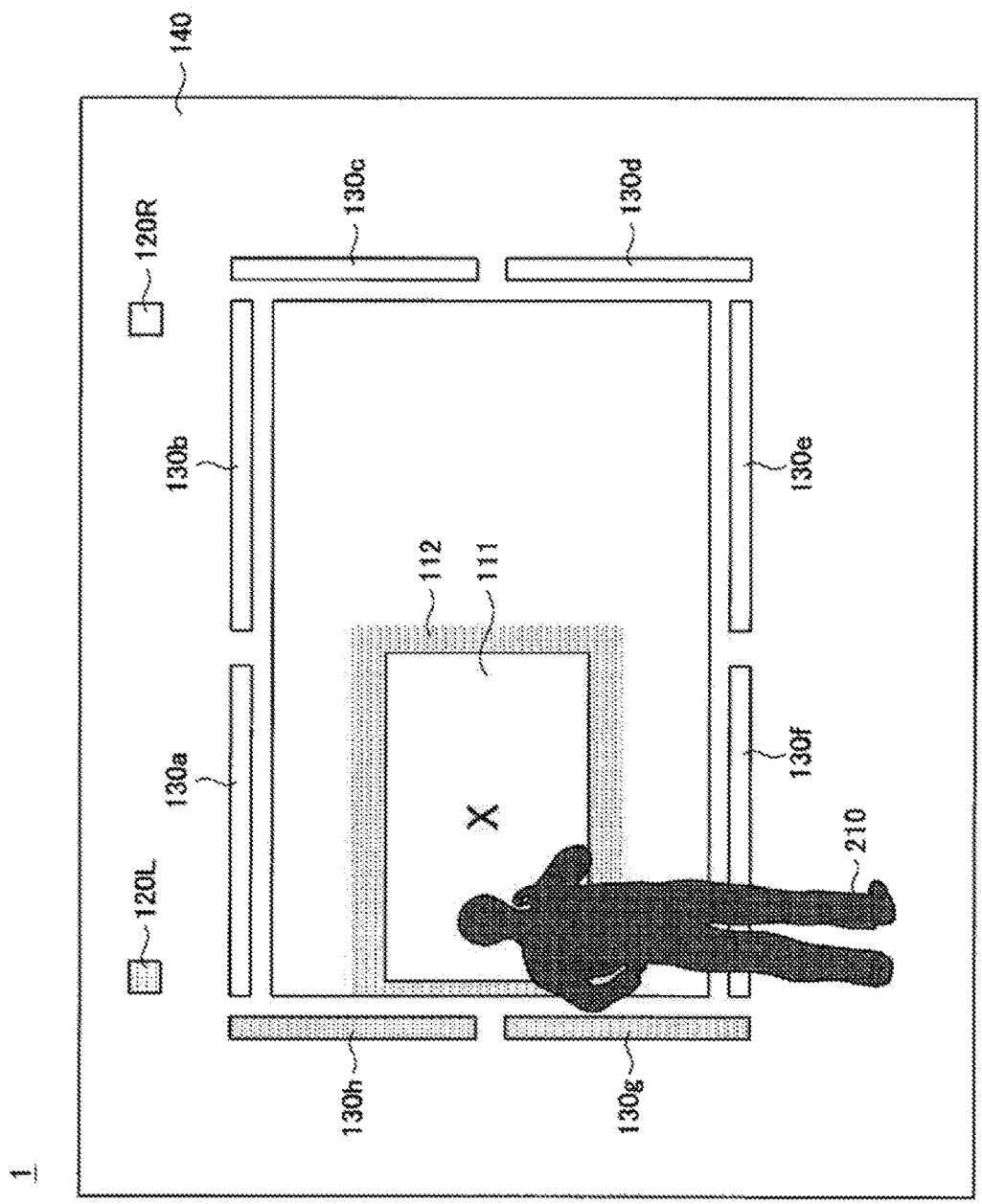
FIG. 2 is an explanatory diagram for describing an overview of a light emission control process according to the present embodiment.

In the example shown in FIG. 2, the indoor lighting 120 is provided on a ceiling above the display region 110, and includes the indoor lighting 120L provided on the left side and the indoor lighting 120R provided on the right side. Driving of the indoor lightings 120L and 120R can be independently controlled. For example, only one of the indoor lightings 120L and 120R may emit light, and the indoor lightings 120L and 120R may emit light in different colors and at different brightness levels.

The arrangement of the indoor lighting 120 shown in FIG. 1 is an example, and the present embodiment is not limited thereto. The number of indoor lightings 120 that are disposed and disposition positions thereof can be arbitrarily set. For example, the indoor lighting 120 may be provided on the ceiling, on left and right wall surfaces of the display region 110, on the floor, or the like.

The ambient lighting 130 is provided to surround a periphery of the display region 110, and provided to illuminate a predetermined region including at least the bezel of the display region 110. The ambient lighting 130 may be configured to illuminate a wall surface (that is, a rear surface) around the display region 110 in addition to the bezel of the display region 110. Driving of the ambient lighting 130 is controlled under control of the light emission control unit 345 (shown in FIG. 3) to be described below. The ambient lighting 130 can set a color and brightness of light emission to any value. In addition, the ambient lighting 130 may have directivity, and set a direction in which light is emitted to any direction. When driving of the ambient lighting 130 is appropriately controlled, an environment around the display region 110, and particularly a light environment of a boundary region including the bezel of the display region 110, is adjusted. The ambient lighting 130 is also referred to as a lighting for adjusting a background environment of the display region 110.

In the example shown in FIG. 1, the ambient lighting 130 is divided into 8 portions (the ambient lightings 130a to 130h). In each of the ambient lightings 130a to 130h, a plurality of light emitting elements 131 (for example, light emitting diodes (LEDs)) are arranged. In the present embodiment, driving may be controlled for each of the ambient lightings 130a to 130h. For example, any of the ambient lightings 130a to 130h may selectively emit light, and many of the ambient lightings 130a to 130h may emit light in different colors and at different brightness levels. However, the present embodiment is not limited thereto, and a division by which driving of the ambient lighting 130 is controlled can be arbitrarily set. For example, driving may be controlled for each of the light emitting elements provided in the ambient lightings 130a to 130h.

The arrangement of the ambient lighting 130 shown in FIG. 1 is an example and the present embodiment is not limited thereto. The ambient lighting 130 may be provided around the display region 110 to illuminate at least a predetermined region including the bezel of the display region 110, and the number of disposed lightings and disposition positions thereof can be arbitrarily set.

The imaging device 150 is an imaging device configured to image an actual space, for example, a digital still camera or a digital video camera. The imaging device 150 images a user who observes the display region 110. In the example shown in FIG. 1, the imaging device 150 is disposed to face the front side in the vicinity of an upper end of substantially the center of the display region in the horizontal direction, and images the user who observes the display region 110 from substantially the front. In the display system 1, based on an image including a state of the user captured by the imaging device 150, information about the user (hereinafter referred to as user information) based on a state of the user who views the display region 110, for example, a position of the user and a line of sight of the user, is acquired. The acquired user information is used to specify a viewing region that is a region that the user views within the display region 110.

The arrangement of the imaging device 150 shown in FIG. 1 is an example and the present embodiment is not limited thereto. The imaging device 150 may be provided to be able to image the user who observes the display region 110 (that is, provided to be able to acquire the user information), and the number of disposed imaging devices and disposition positions thereof can be arbitrarily set.

The overall configuration of the display system according to the present embodiment has been described above with reference to FIG. 1.

(1-2. Overview of a Light Emission Control Process)

Next, an overview of the light emission control process performed in the display system 1 according to the present embodiment will be described with reference to FIG. 2. FIG. 2 is an explanatory diagram for describing the overview of the light emission control process according to the present embodiment.

A state in which a user 210 uses the display system 1 is shown in FIG. 2. In FIG. 2 as well as FIG. 13, FIG. 15, and FIG. 16 (to be described below), the imaging device 150 and the light emitting element 131 are not shown, and the configuration shown in FIG. 1 is shown in a simplified manner. An environment area 140 shows an imaginary region whose environment may be controlled according to the light emission control process according to the present embodiment. The environment area 140 is a region (for example, a space in front of the display region 110, a wall inside a room, a floor, or a ceiling) around the display region 110, which has a light environment that may be changed when light emission of the indoor lighting 120, the ambient lighting 130 and a display light emission region 112 (to be described below) is controlled.

In the example shown in FIG. 2, one user 210 stands in front of the display region 110 and views a content item X that is displayed in a content display region 111 within the display region 110. In the present embodiment, for example, based on the user information indicating the state of the user including a position and a line of sight of the user, a viewing region that is a region that the user views is specified. According to content that is displayed in the viewing region, light emission of a region (a light emission control region to be described below) around the viewing region is controlled. For example, according to the example shown in FIG. 2, the user observes the content display region 111 and the viewing region may be specified as a region overlapping the content display region 111. Therefore, light emission of the indoor lighting 120L and the ambient lightings 130g and 130h that are disposed in the vicinity of the content display region 111 between the indoor lighting 120 and the ambient lighting 130 may be controlled.

In the present embodiment, when light emission of a region around the viewing region is controlled, a predetermined region around the content display region 111 overlapping the viewing region within the display region 110 may be a light emission control target. Hereinafter, a region serving as a light emission control target within the display region 110 is also referred to as the display light emission region 112. Displaying of the display light emission region 112 in a predetermined color and at a predetermined brightness level can be considered as controlling light emission of the display light emission region 112.

In this manner, in the present embodiment, when light emission of a region around the viewing region is controlled, light emission of the indoor lighting 120, the ambient lighting 130 and/or the display light emission region 112 within the display region 110 may be controlled. A specific configuration whose light emission will be controlled may be decided based on a position, a size and the like of the viewing region. Hereinafter, a region whose light emission is to be controlled and that is decided based on the viewing region is referred to as a light emission control region. A process of deciding the light emission control region will be described in detail in the following (4. Light emission control region setting process).

In the present embodiment, when light emission of the light emission control region is controlled according to content, it is possible to provide a more pleasant use sensation to the user. For example, a light emission control pattern when the light emission control region is caused to emit light is set according to a control purpose that may be set in advance. The control purpose includes, for example, visibility improvement, physiological effect induction, and spatial presentation. For example, when the visibility improvement is the control purpose, light emission of the light emission control region may be controlled such that a contrast between a display of the content display region 111 and a space therearound becomes smaller. Accordingly, it is possible to improve visibility of the content display region 111 for the user. In addition, for example, when the physiological effect induction is the control purpose, light emission of the light emission control region may be controlled such that the user experiences a physiological effect associated with content by, for example, changing a background color (a color of a region around the content display region 111) of content. In addition, for example, when the spatial presentation is the control purpose, light emission of the light emission control region may be controlled such that a realistic sensation is provided to the user by artificially reproducing lighting control of content such as a live show or concert in an actual space. For example, the control purpose and the light emission control pattern according to a type of content are set in advance, a light emission control pattern for the control purpose according to content that is displayed in the viewing region is appropriately selected, and light emission of the light emission control region may be controlled based on the selected light emission control pattern. A process of deciding the light emission control pattern will be described in detail in the following (5. Light emission control pattern setting process).

The overview of the light emission control process performed in the display system according to the present embodiment has been described above with reference to FIG. 2.

(1-3. Functional Configuration)

Figure 3:
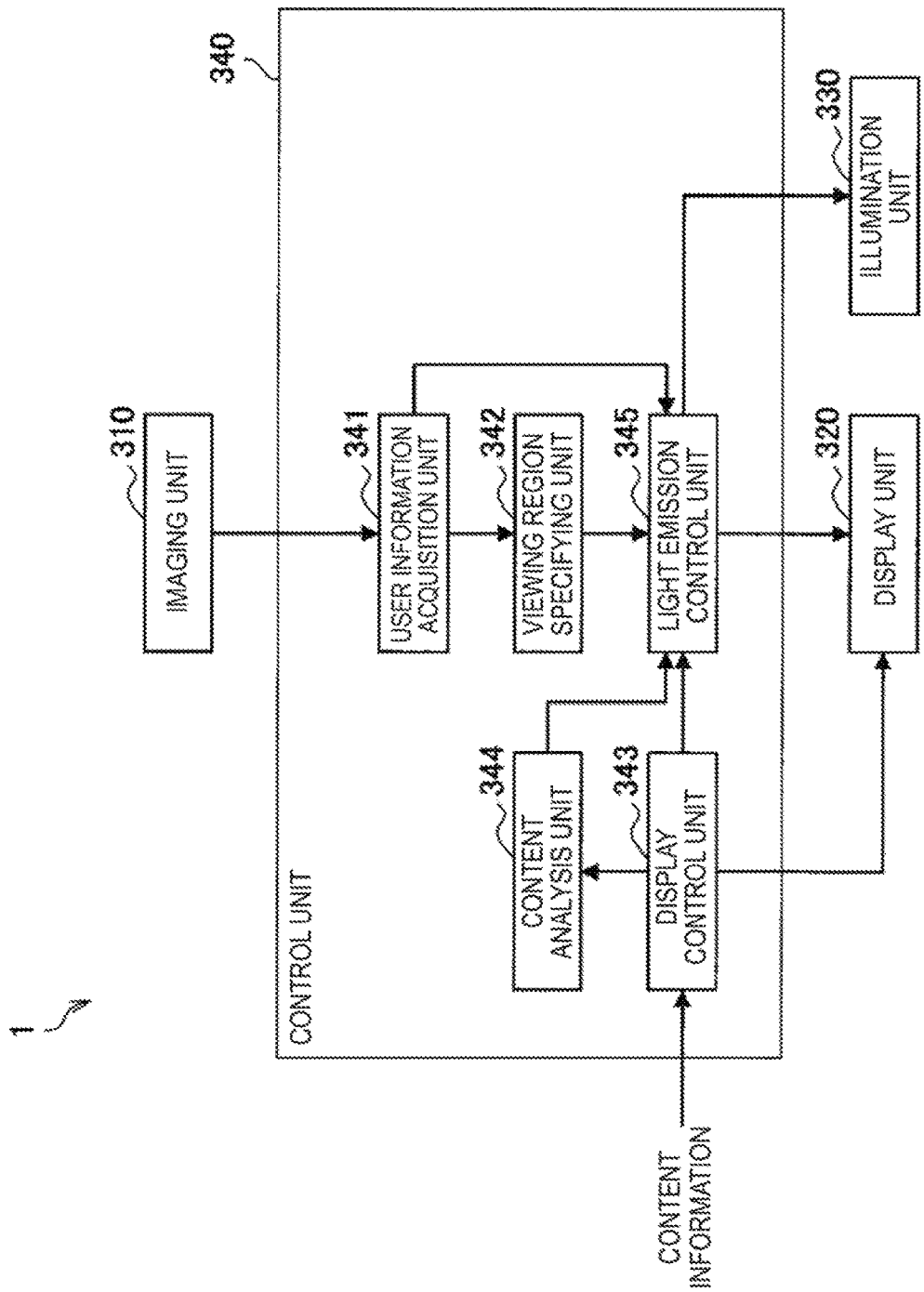
FIG. 3 is a functional block diagram showing an example of a functional configuration of a display system according to the present embodiment.

Next, a functional configuration of the display system 1 for implementing the light emission control process according to the present embodiment described above will be described with reference to FIG. 3. FIG. 3 is a functional block diagram showing an example of a functional configuration of the display system 1 according to the present embodiment.

As shown in FIG. 3, the display system 1 according to the present embodiment includes an imaging unit 310, a display unit 320, an illumination unit 330 and a control unit 340 as functions thereof.

The imaging unit 310 includes an imaging device, for example, a digital still camera and a digital video camera, and captures an image of an actual space. The imaging unit 310 may capture a still image or a moving image. The imaging unit 310 corresponds to the imaging device 150 shown in FIG. 1. In the present embodiment, the imaging unit 310 images the user who observes the display region 110. The imaging unit 310 is preferably arranged at a position from which the user can be imaged from substantially the front, and may be preferably provided, for example, in the vicinity of an upper end of substantially the center of the display region 110 in the horizontal direction. This is because, as will be described below, based on the image captured by the imaging unit 310, for example, a process of recognizing the user's face is performed and a direction of a line of sight of the user is detected.

The imaging unit 310 provides information about the captured image including a state of the user to a user information acquisition unit 341 of the control unit 340 to be described below. The imaging unit 310 can intermittently provide information about the captured image to the user information acquisition unit 341 at a predetermined timing.

The timing may be arbitrary, or may be appropriately set by the user or a designer of the display system 1.

The display unit 320 is an output interface that displays various types of information on a display screen using various formats such as text, an image, a chart, and a graph, and thus visually notifies the user of the information. The display unit 320 includes various types of display devices, for example, an LCD and an organic EL display. The display unit 320 corresponds to the display device 110 shown in FIG. 1. In the present embodiment, the display unit 320 can display various types of content on the display screen (corresponding to the display region 110 shown in FIG. 1) under control of the display control unit 343 of the control unit 340 to be described below. A plurality of content display regions may be provided on the display screen of the display unit 320. A plurality of different types of content may be displayed in the content display regions at the same time.

In addition, in the present embodiment, within the display screen of the display unit 320, a region around the content display region may serve as a display light emission region (corresponding to the display light emission region 112 shown in FIG. 2) serving as a light emission control target rather than a region for displaying content. The display light emission region is not a region in which the original function of displaying information is expressed but is a region that serves as the background of the content display region. The display unit 320 causes the display light emission region corresponding to the set light emission control region to emit light in a predetermined color and at a predetermined brightness level based on the set light emission control pattern under control of the light emission control unit 345.

The illumination unit 330 includes various types of light emitting elements, for example, an LED and an organic EL element, and emits light in a predetermined color and at a predetermined brightness level. The illumination unit 330 corresponds to the indoor lighting 120 and the ambient lighting 130 shown in FIG. 1. In the present embodiment, the illumination unit 330 causes a portion corresponding to the set light emission control region to emit light in a predetermined color and at a predetermined brightness level based on the set light emission control pattern under control of the light emission control unit 345 of the control unit 340 to be described below.

The control unit 340 (corresponding to the information processing device of the present disclosure) includes various types of processors, for example, a central processing unit (CPU) and a digital signal processor (DSP), and controls various types of processes performed in the display system 1. The control unit 340 includes the user information acquisition unit 341, a viewing region specifying unit 342, the display control unit 343, a content analysis unit 344 and the light emission control unit 345 as functions thereof. Functions of the control unit 340 including such functions are implemented, for example, when a processor of the control unit 340 is operated according to a predetermined program. Although not shown in FIG. 1 and FIG. 2, in the present embodiment, a signal processing element such as a chip in which a processor of the control unit 340 is mounted may be installed in the display system 1. Alternatively, an information processing device such as a PC in which a computer program implementing functions of the control unit 340 is installed may be included in the display system 1.

Based on an image including a state of the user captured by the imaging unit 310, the user information acquisition unit 341 acquires the user information based on the state of the user who views the display region 110. For example, the user information includes the presence of the user (whether a user is in front of the display region 110, that is, whether there is a user who observes the display region 110), a position of the user with respect to the display region 110 (that is, a distance from the display region 110 to the user and/or a direction of the user with respect to the display region 110), a direction of the user's body, a direction of the user's face, a direction of a line of sight of the user, an age of the user, and/or information about an identification result of the user according to a face authentication process (hereinafter referred to as identification information).

The user information acquisition unit 341 can acquire various pieces of user information described above by analyzing the image captured by the imaging unit 310. For example, the user information acquisition unit 341 analyzes the image, determines whether the user (that is, an object corresponding to a human) is included in the image, and thus can determine whether there is a user who observes the display region 110. In addition, for example, the user information acquisition unit 341 analyzes an image, specifies an object corresponding to the user, and thus can detect a position of the user and a direction of the user's body with respect to the display region 110. In addition, for example, the user information acquisition unit 341 analyzes the image of the user's face, and thus can detect a direction of the face, a direction of a line of sight, an age and the like. In addition, the user information acquisition unit 341 performs a so-called face recognition process based on the image of the user's face, and thus can identify the user who observes the display region 110. However, the above-described various types of information are examples of the user information. In the present embodiment, all information that may be acquired by analyzing the captured image and indicates a state of the user who views the display region 110 is handled as the user information. In addition, various known techniques can be used as an image analysis technique for acquiring user information. The user information acquisition unit 341 provides the acquired user information to the viewing region specifying unit 342 and the light emission control unit 345.

Although not shown in FIG. 3, the display system 1 may include a sensor unit having a sensor capable of detecting a distance from the user such as a distance measuring sensor in addition to the imaging unit 310. The user information acquisition unit 341 may acquire the user information based on a detection result of the sensor unit.

The viewing region specifying unit 342 specifies a viewing region that is a region that the user views in the display region 110 based on the acquired user information. For example, the viewing region specifying unit 342 can specify the viewing region based on information about a distance from the display region 110 to the user and information about a line of sight of the user, which are included in the user information. Specifically, the viewing region specifying unit 342 can estimate a range in which the user can discriminate a color (a range in which a color can be determined within a field of view) from information about a line of sight of the user (line of sight information). Therefore, the viewing region specifying unit 342 sets a region in which the user can discriminate a color within the display region 110 (a color discrimination region) based on information about the range in which the user can discriminate a color and information about the distance from the display region 110 to the user (distance information), and can specify the viewing region of the user in the display region 110 based on the color discrimination region. When the color discrimination range is estimated, the viewing region specifying unit 342 may use other information, for example, information about a position of the user, information about a direction of the user's body, or information about a direction of the user's face, instead of information about a line of sight of the user. The viewing region specifying unit 342 provides information about the specified viewing region to the light emission control unit 345. A process of specifying a viewing region of a user will be described in detail again in the following (3. Viewing region specifying process).

The display control unit 343 controls driving of the display unit 320 and causes various types of information to be displayed on the display screen (that is, the display region 110) of the display unit 320. In the present embodiment, the display control unit 343 causes various types of content to be displayed on the display screen of the display unit 320. The display control unit 343 sets one or a plurality of content display regions (corresponding to the content display region 111 shown in FIG. 2) within the display screen of the display unit 320 and causes each type of content to be displayed in one of the content display regions 111. The display control unit 343 may arbitrarily adjust settings (for example, a position, the number of regions, and a size) of the content display region 111 within the display region 110 or may dynamically change such settings while content is displayed. In addition, the display control unit 343 may cause the plurality of content display regions 111 to overlap within the display region 110. The display control unit 343 may adjust the content display region 111 according to an instruction from the user through an input unit (not shown) including an input device such as a remote controller or may automatically adjust the content display region 111 according to predetermined conditions. For example, according to details of content, a sequence in which the display system 1 has acquired content, and the like, the display control unit 343 may display the content display region 111 in which, for example, video content is displayed, to be larger than the other content display regions 111, and may display the content display region 111 in which the most recently acquired content is displayed in the foreground overlapping the other content display regions 111. The display control unit 343 provides information about the arrangement of the content display region 111 in the display region 110 to the light emission control unit 345.

Here, content that is displayed on the display unit 320 by the display control unit 343 may be content that is stored in a storage unit (not shown) that may be provided in the display system 1 and can store various types of information or may be content that is input from another external device (for example, content that is delivered from a content distributor such as a broadcasting station). The display control unit 343 acquires information about content (content information) from the storage unit or the other external device, and can display the content on the display unit 320. Here, in the content information, in addition to the content itself, various types of information (for example, metadata) associated with the content are included. Information about, for example, a type of content, a title of content, and an overview of content may be included in the metadata. The display control unit 343 displays the content on the display unit 320 based on the content information and provides information about content that is displayed to the content analysis unit 344.

The content analysis unit 344 analyzes content that is displayed on the display unit 320 by the display control unit 343 based on the content information. For example, the content analysis unit 344 analyzes the content, and thus can specify a type of the content. Here, the type of the content includes any type of content that may be displayed in the display region 110, for example, a movie, an E-book, a news site, and a map. The content analysis unit 344 may analyze content that is currently displayed on the display unit 320 by the display control unit 343 in real time, and thus specify a type of the content. Based on the metadata included in the content information, a type of content may be specified when content is acquired or selected (when content that is displayed in the display region 110 by the display control unit 343 is selected).

In addition, for example, the content analysis unit 344 may analyze content, and thus acquire information about a color when content is displayed. The information about a color when content is displayed may include information about a type of a color and a distribution of a color that are displayed within the content display region, a time change according to the reproducing of content, and the like. The content analysis unit 344 may analyze content that is currently displayed on the display unit 320 by the display control unit 343 in real time, and thus acquire information about a color when content is displayed intermittently, and may analyze the content when content is acquired or selected and acquire information about a color when content is displayed.

The content analysis unit 344 provides information about the result obtained by analyzing the content that is displayed on the display unit 320 by the display control unit 343 to the light emission control unit 345.

The light emission control unit 345 controls light emission of the light emission control region around the content display region 111 that is a region in which content is displayed within the display region 110 based on the user information acquired by the user information acquisition unit 341. Specifically, processes performed in the light emission control unit 345 may roughly include a light emission control region setting process, a light emission control pattern setting process, a focus determination process and a light emission control adjustment process.

In the light emission control region setting process, based on the viewing region that is specified by the viewing region specifying unit 342 based on the user information, the light emission control region serving as a light emission control target is set. As described in the above (2. Overview of a light emission control process), as the light emission control region, one portion of the indoor lighting 120, one portion of the ambient lighting 130, and/or the display light emission region 112 within the display region 110 may be set.

In the light emission control pattern setting process, according to content included in the viewing region that is specified by the viewing region specifying unit 342 based on the user information, a light emission control pattern for the light emission control region set in the light emission control region setting process is set. Here, the light emission control pattern may specifically indicate a method of controlling light emission of the light emission control region. For example, in the light emission control pattern, light emission control parameters (for example, a color and brightness) when the indoor lighting 120 and the ambient lighting 130, and/or the display light emission region 112 included in the light emission control region are caused to emit light may be set as numerical values. When the illumination unit 330 and/or the display unit 320 are driven by the light emission control unit 345 based on the set light emission control pattern, the indoor lighting 120, the ambient lighting 130 and/or the display light emission region 112 that are set as the light emission control regions emit light in a color and brightness according to the parameters set in the light emission control pattern.

In the focus determination process, when displays of a plurality of types of content are included in the viewing region that is specified by the viewing region specifying unit 342 based on the user information, one light emission control region and one light emission control pattern corresponding to the viewing region are selected from among a plurality of light emission control regions and a plurality of light emission control patterns that are set for each type of content. As described above, in the light emission control pattern setting process, since the light emission control pattern is set for content included in the viewing region, for example, when a plurality of types of content are included in the viewing region, a plurality of light emission control regions and light emission control patterns corresponding to each type of content may be set. In the focus determination process, for example, from among the plurality of types of content included in the specified viewing region, content on which the user is focusing is estimated, and a light emission control region and a light emission control pattern set for the estimated content are selected as the light emission control region and the light emission control pattern corresponding to the viewing region.

The light emission control unit 345 may not necessarily perform the focus determination process. As described above, the focus determination process is a process that may be performed when the plurality of types of content are included in the viewing region. Therefore, when only one type of content is included in the viewing region and only the light emission control region and the light emission control pattern are set for the content, the focus determination process may not be performed. The focus determination process will be described in detail again in the following (6. Focus determination process).

In the light emission control adjustment process, when a plurality of light emission control regions set for a plurality of users interfere with one another, mutually competitive light emission controls are adjusted based on predetermined conditions. The above-described light emission control region setting process, light emission control pattern setting process and focus determination process may be performed in the viewing region of each user, for example, when information indicating that there are a plurality of users in front of the display region 110 is acquired as the user information. Therefore, when there are a plurality of users, a plurality of light emission control regions and light emission control patterns corresponding to viewing regions of the users may be set. For example, when light emission control regions set for a plurality of different users interfere with one another (for example, some regions overlap), if the light emission control regions are caused to emit light according to the set light emission control patterns, light emission controls are mutually competitive, and there is a possibility of a desired effect not being obtained. In the light emission control adjustment process, in this manner, when there are a plurality of users and a plurality of light emission control regions and light emission control patterns are set, a process of arbitrating the light emission control regions and the light emission control patterns that may interfere with one another is performed according to predetermined conditions.

The light emission control unit 345 may not necessarily perform the light emission control adjustment process. As described above, the light emission control adjustment process is a process that may be performed when a plurality of light emission control regions set for a plurality of users interfere with one another. Therefore, when the presence of only one user in front of the display region 110 is detected, and only a light emission control region and a light emission control pattern are set for a viewing region of the user, the light emission control adjustment process may not be performed. The light emission control adjustment process will be described in detail again in the following (7. Light emission control adjustment process).

The light emission control unit 345 performs the above-described light emission control region setting process, light emission control pattern setting process, focus determination process and light emission control adjustment process (as described above, the focus determination process and the light emission control adjustment process may be omitted), and thus can set the light emission control region whose light emission is to be finally controlled and the light emission control pattern to be implemented for the light emission control region. The light emission control unit 345 drives the display unit 320 and/or the illumination unit 330 according to the set light emission control region and light emission control pattern. Accordingly, the light emission control region (for example, the display light emission region 112 that may be included in the display unit 320 and/or the indoor lighting 120 and the ambient lighting 130 that may be included in the illumination unit 330) that may be set around the content display region corresponding to the viewing region of the user emits light according to the set light emission control pattern. Since the light emission control pattern is, for example, set to improve visibility for the user and set to provide a realistic sensation to the user according to the content included in the viewing region, it is possible to provide a more pleasant use sensation to the user.

The functional configuration of the display system 1 according to the present embodiment has been described above with reference to FIG. 3. As described above, in the present embodiment, the viewing region of the user is specified, and the light emission control region that is a region whose light emission is to be controlled is set based on the viewing region. In addition, based on the content included in the viewing region, the light emission control pattern for controlling light emission of the light emission control region is set. Then, light emission of the display unit 320 and/or the illumination unit 330 is controlled based on the set light emission control region and light emission control pattern, and thus light emission of the region around the content display region in which the content is displayed is controlled. Therefore, the region around the content display region is caused to emit light in a color and/or brightness according to the content, and a more pleasant use sensation is provided to the user. In addition, even when the plurality of content display regions 111 are displayed in the display region 110 and the plurality of users view different types of content in the content display regions 111, the viewing region of each user is specified, and light emission control is performed based on the light emission control region and the light emission control pattern set for each user. Accordingly, light emission control is performed on each type of content for each user. Therefore, even when the plurality of users view different types of content, light emission control appropriate for each user may be implemented.

The display system 1 may include other configurations in addition to the shown configurations. For example, the display system 1 may further include a configuration such as an input unit that is an input interface configured to receive an operation input of the user and a storage unit configured to store various types of information that are used in various types of processes in the display system 1. The input unit includes an input device, for example, a remote controller, and the user can input various types of information to the display system 1 through the input unit. For example, when the user performs an operation input, the display control unit 343 may control a display of the display region 110, for example, changing positions and the number of content display regions 111 and changing content that is displayed in the content display region 111. In addition, the storage unit can store various types of information processed by the control unit 340 and results of various types of processes performed by the control unit 340, for example, content information, user information, and a table (to be described below) showing light emission control parameters that are used when the light emission control pattern is set. The control unit 340 refers to the storage unit, appropriately acquires necessary information, and thus can perform various types of processes.

In addition, the configurations shown in FIG. 3 may be integrally formed as one device or formed as a plurality of devices communicatively connected to one another via a network. For example, functions of the control unit 340 may be performed by one processor or one information processing device or may be performed by a plurality of processors or a plurality of information processing devices in cooperation. Alternatively, functions of the control unit 340 may be performed by an information processing device or an information processing device group such as a server that is provided on a network (for example, a so-called cloud). In this case, functions of the imaging unit 310, the display unit 320 and the illumination unit 330 may be implemented by an imaging device, a display device, and a lighting that are provided in a place in which the user views content, for example, inside a home. Such a configuration performs communication of various types of information, an instruction, or the like with an information processing device that is arranged in another place via a network, and thus the functions shown in FIG. 3 may be implemented.

In addition, a computer program for implementing the above-described functions of the display system 1 according to the present embodiment and particularly, the functions of the control unit 340, is created, and can be installed in a personal computer or the like. In addition, it is possible to provide a computer readable recording medium in which such a computer program is stored. The recording medium may be, for example, a magnetic disk, an optical disc, a magneto optical disc, or a flash memory. In addition, the above computer program may be delivered, for example, via a network, without using the recording medium.

(2. Information Processing Method)

Figure 4:
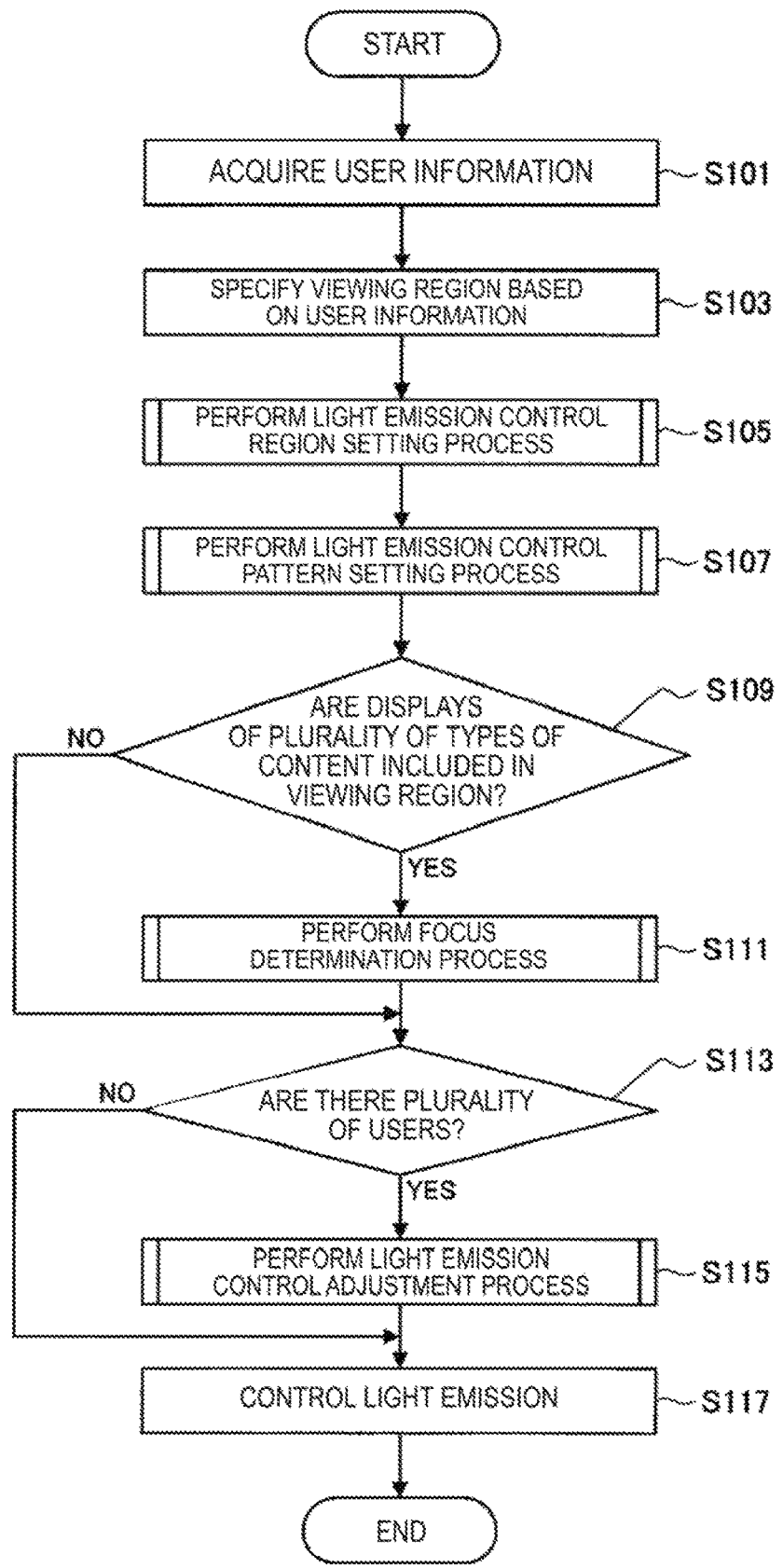
FIG. 4 is a flowchart showing an example of a processing procedure of an information processing method according to the present embodiment.

Next, a processing procedure of the information processing method (a light emission control method) according to the present embodiment that is performed in the above-described display system 1 will be described with reference to FIG. 4. FIG. 4 is a flowchart showing an example of a processing procedure of the information processing method according to the present embodiment. Processes shown in FIG. 4 may be performed according to functions shown in FIG. 3.

As shown in FIG. 4, in the information processing method according to the present embodiment, first, user information is acquired (Step S101). The process shown in Step S101 corresponds to, for example, the process performed in the user information acquisition unit 341 shown in FIG. 3. In the process shown in Step S101, for example, based on the image captured by the imaging unit 310, information about the presence of the user, a position of the user, a direction of the user's body, a direction of the user's face, a line of sight of the user, the user's face, an age of the user and/or user identification information according to the face recognition process may be acquired as the user information.

Next, the viewing region is specified based on the acquired user information (Step S103). The process shown in Step S103 corresponds to, for example, the process that is performed in the viewing region specifying unit 342 shown in FIG. 3. In the process shown in Step S103, based on the information about a position of the user, a direction of the user's body, a direction of the user's face and/or a line of sight of the user included in the user information, a viewing region that is a region that the user views in the display region 110 is specified. A viewing region specifying process will be described in detail in the following (3. Viewing region specifying process).

The following processes shown in Step S105 to Step S117 correspond to, for example, processes that are mainly performed in the light emission control unit 345 shown in FIG. 3. First, in Step S105, the light emission control region is set based on the specified viewing region. In the process shown in Step S105, for example, based on a position and a size of the viewing region within the display region 110, as shown in FIG. 2, one portion of the indoor lighting 120, one portion of the ambient lighting 130, and/or the display light emission region 112 within the display region 110 may be set as the light emission control regions. The light emission control region setting process will be described in detail in the following (4. Light emission control region setting process).

Next, in Step S107, the light emission control pattern is set based on content that is displayed in the specified viewing region. In the process shown in Step S107, according to, for example, a type, a display color, and a brightness of content that is displayed in the viewing region, the light emission control pattern indicating a method of controlling light emission for the set light emission control region may be set. The light emission control pattern setting process will be described in detail in the following (5. Light emission control pattern setting process).

Next, in Step S109, it is determined whether displays a plurality of types of content are included in the viewing region. The process shown in Step S109 is performed in the light emission control unit 345 based on, for example, information about the specified viewing region that is provided from the viewing region specifying unit 342 shown in FIG. 3 and information about the arrangement of the content display region 111 in the display region 110 that is provided from the display control unit 343. When it is determined that displays of a plurality of types of content are included in the viewing region, the process advances to Step S111, and the focus determination process is performed. In the focus determination process, for example, based on information about a line of sight of the user included in the user information, content on which the user is focusing is estimated from among a plurality of types of content included in the viewing region, and a light emission control region and a light emission control pattern corresponding to the estimated content may be selected as the light emission control region and the light emission control pattern corresponding to the viewing region of the user. The focus determination process will be described in detail in the following (6. Focus determination process).

On the other hand, in Step S109, when it is determined that displays of a plurality of types of content are not included in the viewing region, the process shown in Step S111 is omitted and the process advances to Step S113.

In Step S113, it is determined whether there are a plurality of users in front of the display region 110. The process shown in Step S109 may be performed in the light emission control unit 345 based on, for example, the user information that is provided from the user information acquisition unit 341 shown in FIG. 3. When it is determined that there are a plurality of users, the process advances to Step S115, and the light emission control adjustment process in which light emission control set according to the viewing region of each user is adjusted is performed. In the light emission control adjustment process, for example, when the light emission control regions set according to viewing regions of the users interfere with one another, based on predetermined conditions, for example, a light emission control region and a light emission control pattern set for the light emission control region of one side are preferentially selected over those of the other side. Therefore, the light emission control regions and the light emission control patterns that may be mutually competitive are adjusted, and a light emission control region whose light emission is to be finally controlled and a light emission control pattern to be finally implemented are decided. The light emission control adjustment process will be described in detail in the following (7. Light emission control adjustment process).

On the other hand, in Step S113, when it is determined that there are not a plurality of users in front of the display region 110, the process shown in Step S115 is omitted and the process advances to Step S117.

In Step S117, light emission control is performed on the set light emission control region based on the set light emission control pattern. For example, a region and/or a portion corresponding to the light emission control region included in the display unit 320 and the illumination unit 330 are driven according to the set light emission display pattern by the light emission control unit 345 shown in FIG. 3. Accordingly, the region around the content display region corresponding to the viewing region of the user is caused to emit light in a color and/or at a brightness according to the content and thus a more pleasant use sensation is provided to the user.

The processing procedure of the information processing method according to the present embodiment has been described above with reference to FIG. 4. A series of processes shown in FIG. 4 may be repeatedly performed at predetermined intervals while the display system 1 is used. Here, an interval at which the series of processes shown in FIG. 4 is repeated is preferably set to a relatively long time, for example, about 10 (sec). This is because, when the light emission control region and the light emission control pattern are frequently changed according to a slight change in the user information or the content, there is a possibility of a use sensation of the user decreasing conversely.

Processes of Steps S103, S105, S107, S111, and S115 shown in FIG. 4 will be described below in detail in (3. Viewing region specifying process) to (7. Light emission control adjustment process). Unless otherwise indicated, processes in the flowchart of (3. Viewing region specifying process) to (7. Light emission control adjustment process) may be performed in, for example, the light emission control unit 345 shown in FIG. 3.

(3. Viewing Region Specifying Process)

Figure 5:
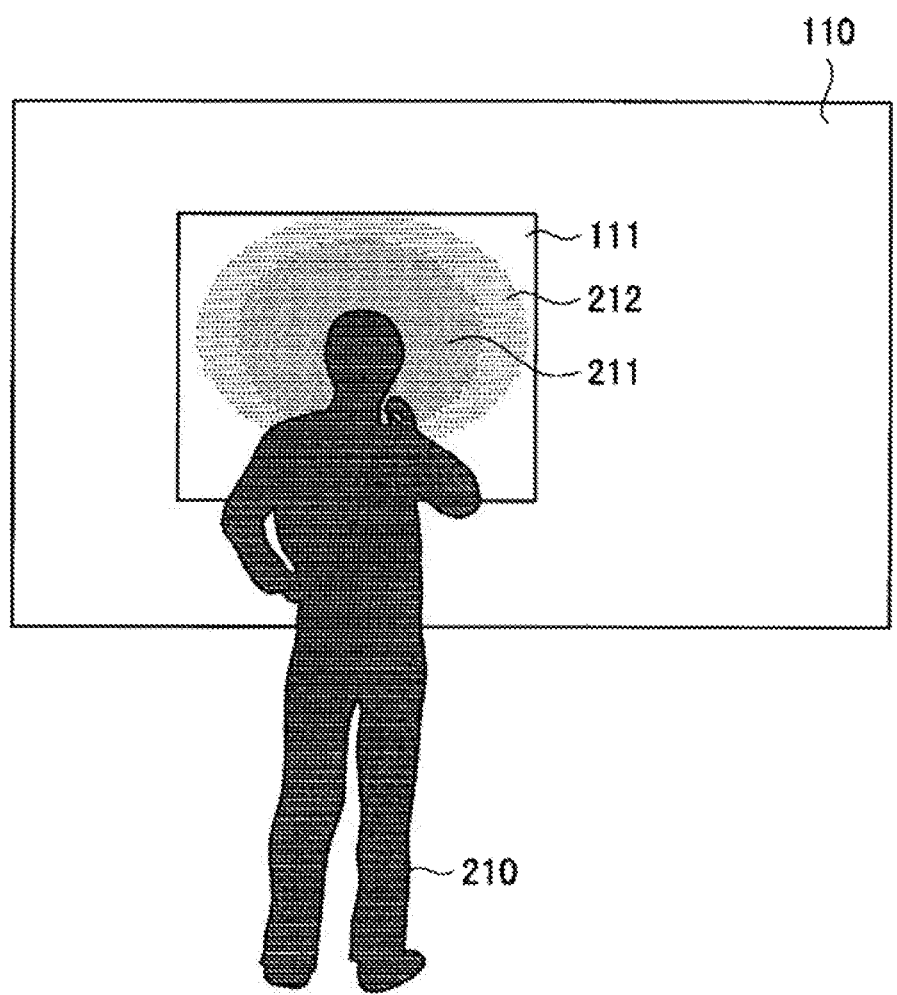
FIG. 5 is an explanatory diagram for describing a viewing region specifying process.
Figure 6:
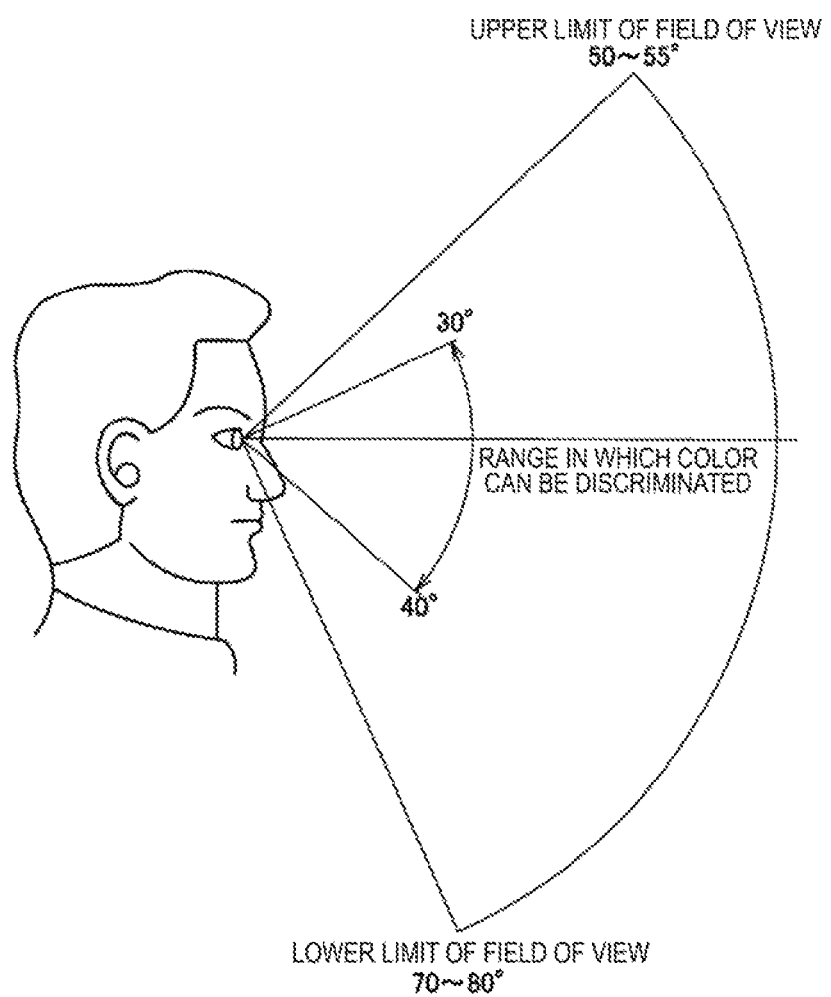
FIG. 6 is an explanatory diagram for describing a field of view characteristic of a human.
Figure 7:
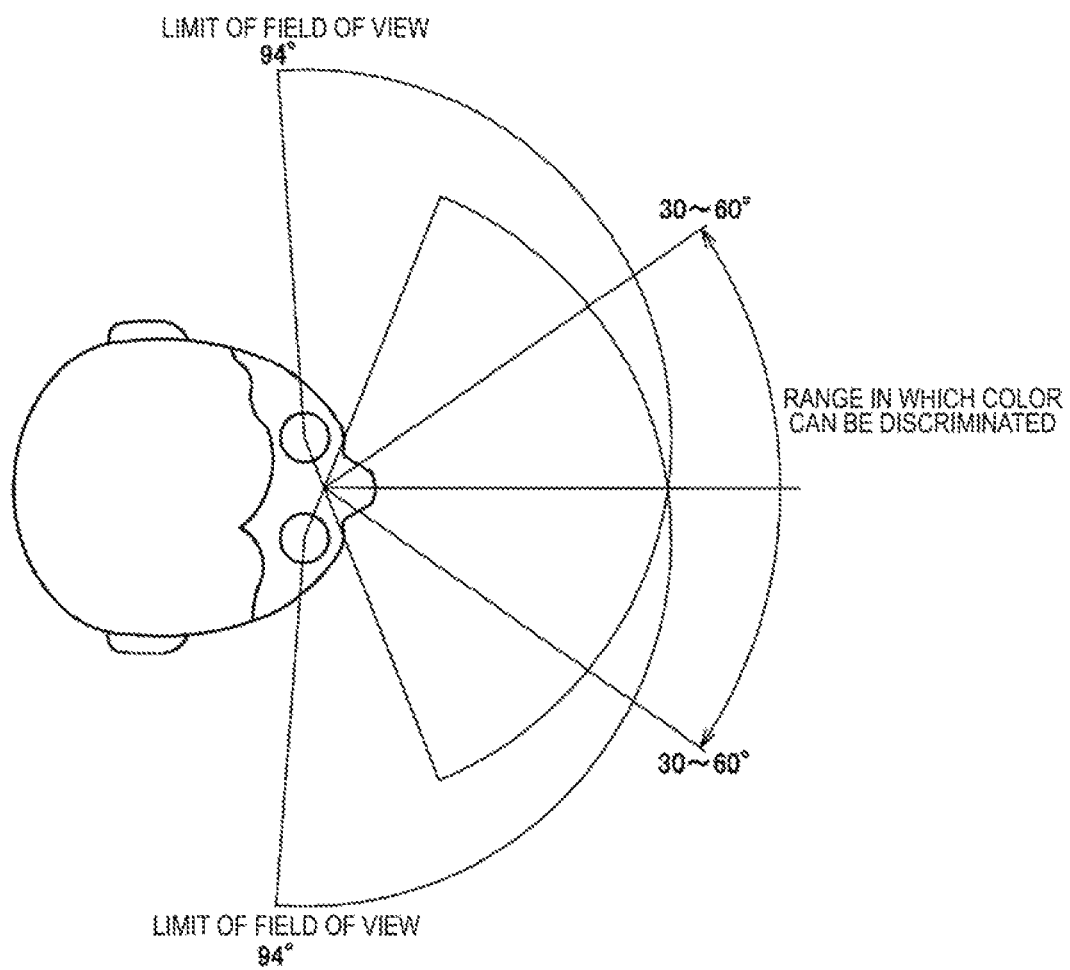
FIG. 7 is an explanatory diagram for describing a field of view characteristic of a human.

The viewing region specifying process according to the present embodiment will be described in detail with reference to FIG. 5 to FIG. 7. FIG. 5 is an explanatory diagram for describing the viewing region specifying process. FIG. 6 and FIG. 7 are explanatory diagrams for describing a field of view characteristic of a human. The viewing region specifying process is a process performed in the viewing region specifying unit 342 shown in FIG. 3 and is a process that corresponds to Step S103 shown in FIG. 4.

In the present embodiment, a viewing region is specified based on the color discrimination region that is a region in which the user can recognize a color within the display region 110. In FIG. 5, the user 210 who observes the content display region 111 provided in the display region 110 is shown and a relation between a color discrimination region 211 and a viewing region 212 of the user 210 is shown. In FIG. 5, for simplicity of illustration, the display region 110 and the content display region 111 are mainly shown among configurations of the display system 1 shown in FIG. 2, and the other configurations are not shown.

For example, the color discrimination region 211 may be set based on line of sight information and distance information (information about a distance from the display region 110 to the user 210) included in the user information. As shown in FIG. 6 and FIG. 7, in general, as a field of view characteristic of a human, a range in which a color can be discriminated within a field of view is known. For example, a range in which a general human can discriminate a color is about 30 (deg) upward, about 40 (deg) in downward, and about 30 to 60 (deg) in a horizontal direction based on a line of sight direction as shown in FIG. 6 and FIG. 7. In the present embodiment, the viewing region specifying unit 342 can estimate a range in which the user 210 can discriminate a color within a field of view based on the line of sight information of the user 210. Therefore, based on information about the estimated range in which the user 210 can discriminate a color and the distance information, the viewing region specifying unit 342 can set the region in which the user 210 can discriminate a color in the same plane as the display region 110 as the color discrimination region 211.

The viewing region specifying unit 342 additionally sets a region serving as a predetermined margin for the set color discrimination region 211, and thus can set the viewing region 212. The margin may be set according to, for example, fluctuation of a line of sight of the user while he or she observes content that is displayed in the content display region 111. In addition, the margin may be set according to, for example, a control purpose when the light emission control pattern is set in the light emission control pattern setting process. When the control purpose is, for example, spatial presentation, since light emission control may be performed such that an atmosphere of a performance such as a concert that is displayed as content is reproduced, the margin may be set to be relatively broad (that is, the viewing region 212 is relatively broad). This is because, when the viewing region 212 is set to be broad, since the light emission control region may also be set across a broad range, the spatial presentation may be more appropriately reproduced. On the other hand, when the control purpose is, for example, visibility improvement, the margin may be set to be relatively narrow (that is, the viewing region 212 is relatively narrow). Alternatively, when the control purpose is visibility improvement, the margin may not be provided. This is because, when the purpose is visibility improvement, if light emission of a broad range of the light emission control region is controlled, there is a possibility of concentration of the user 210 on the content being interfered with.

In this manner, the viewing region specifying unit 342 sets the color discrimination region 211 based on, for example, the line of sight information and the distance information included in the user information, and thus can specify the viewing region. Therefore, since light emission is controlled in a range in which the user 210 can recognize a color more reliably within a field of view, light generated by the light emission control is applied to the user 210 more effectively. In addition, the viewing region specifying unit 342 sets the margin in consideration of the control purpose of light emission control and fluctuation of a line of sight for the color discrimination region 211, and thus specifies the viewing region. Accordingly, the viewing region is more appropriately set, and it is possible to perform light emission control for the user 210 more effectively.

The above-described viewing region specifying process may be performed, for example, at predetermined time intervals. Accordingly, for example, even if the plurality of content display regions 111 are displayed within the display region 110 and the content display region 111 that the user 210 observes is changed, the viewing region 212 is updated to follow a line of sight of the user 210. However, when the user 210 has moved a line of sight and therefore the viewing region 212 has been changed only for a short time, the viewing region 212 is frequently changed, and the light emission control region and the light emission control pattern are also frequently changed accordingly. Therefore, there is a possibility of a use sensation of the user 210 decreasing conversely. Therefore, an interval at which the user information acquisition unit 341 updates the user information that may be used in the viewing region specifying process such as line of sight information may be set to a relatively long time, for example, 10 (sec) or longer. The user information acquisition unit 341 may calculate an average state (for example, in the case of a line of sight direction, an average direction of a line of sight of the user 210 within the predetermined time) of the user 210 within a predetermined time based on images that are consecutively captured for a predetermined time, for example, 10 (sec), and update the user information using the calculated average state.

While a case in which the viewing region 212 is specified based on the line of sight information of the user 210 has been described above, the present embodiment is not limited thereto. For example, the viewing region 212 may be specified based on information about a position of the user 210 with respect to the display region 110, information about a direction of the body of the user 210, and/or information about a direction of the face of the user 210, and the like, which are included in the user information. For example, according to performance (for example, a resolution of an image to be captured) of the imaging unit 310, a direction of the face of the user 210, or a distance from the display region 110 to the user 210, there is a possibility of a line of sight of the user 210 not being detected with high precision. In such a case, the viewing region specifying unit 342 estimates a line of sight direction based on, for example, a position of the user 210, a direction of the body of the user 210, and a direction of a face with respect to the display region 110, and may set the color discrimination region 211 according to the estimated line of sight direction. In this manner, in the present embodiment, even when the line of sight information is not obtained, the viewing region 212 may be appropriately set based on other information included in the user information.

The viewing region specifying process according to the present embodiment has been described above. As described above, according to the present embodiment, the viewing region 212 is set in consideration of a range in which the user 210 can discriminate a color within a field of view. Therefore, when light emission control is performed and predetermined light emission is performed, the color of the emitted light is applied to the user more effectively.

(4. Light Emission Control Region Setting Process)

Figure 8:
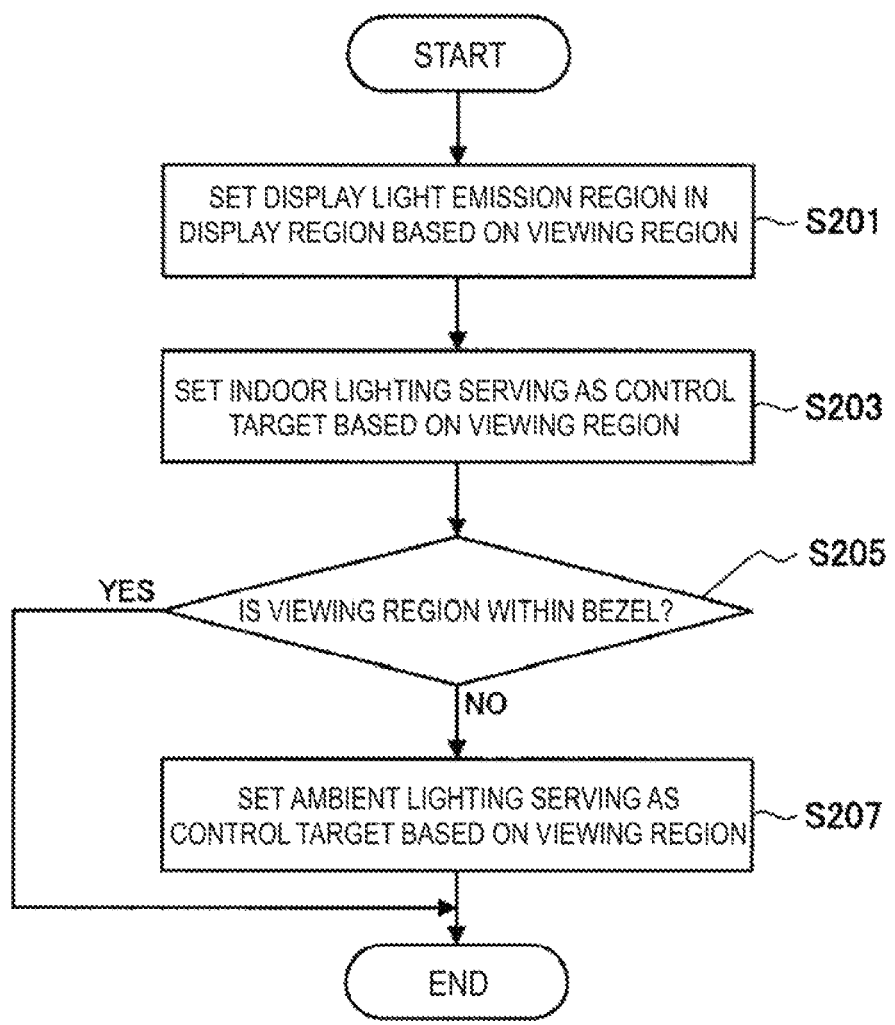
FIG. 8 is a flowchart showing an example of a processing procedure of a light emission control region setting process.
Figure 9:
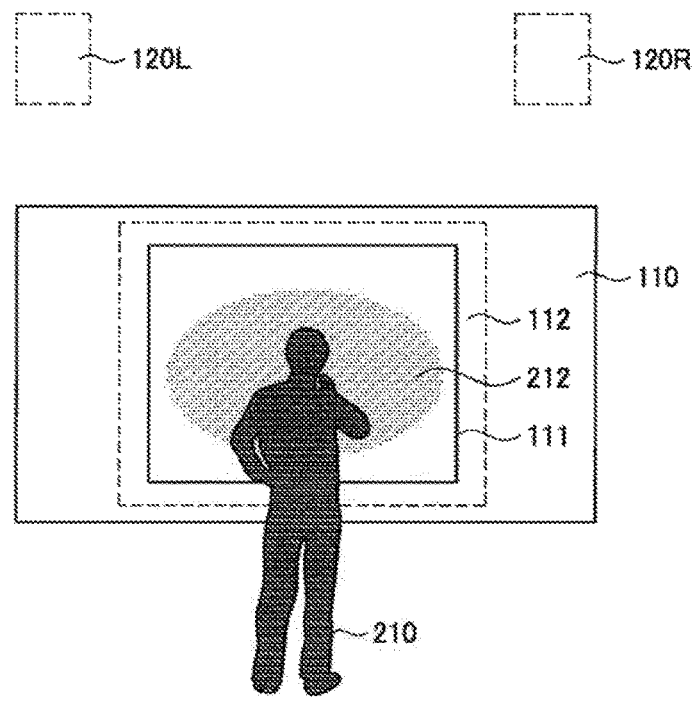
FIG. 9 is a diagram showing an example of a light emission control region set in the light emission control region setting process.
Figure 10:
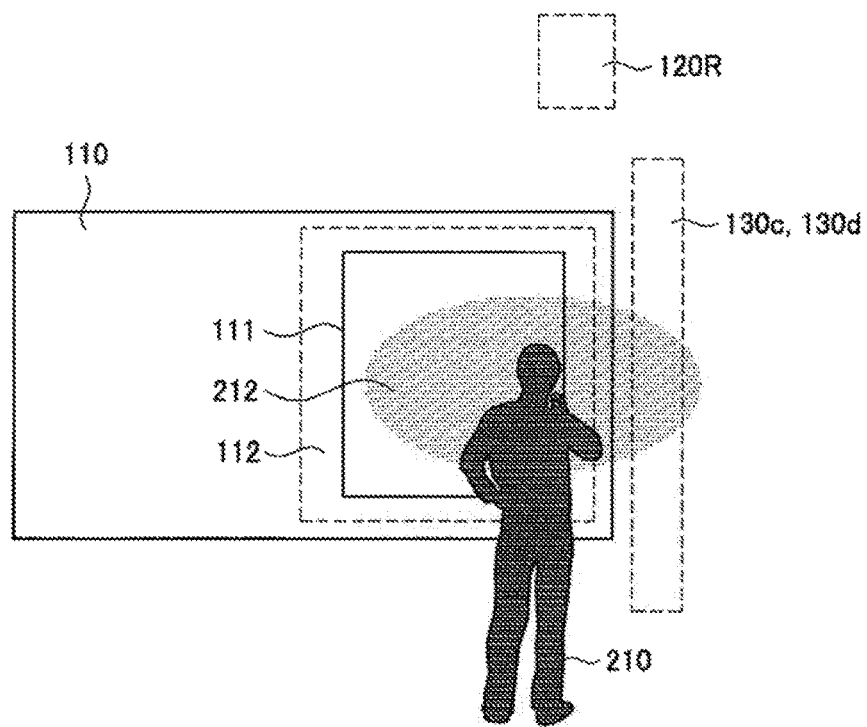
FIG. 10 is a diagram showing an example of a light emission control region set in the light emission control region setting process.
Figure 11:
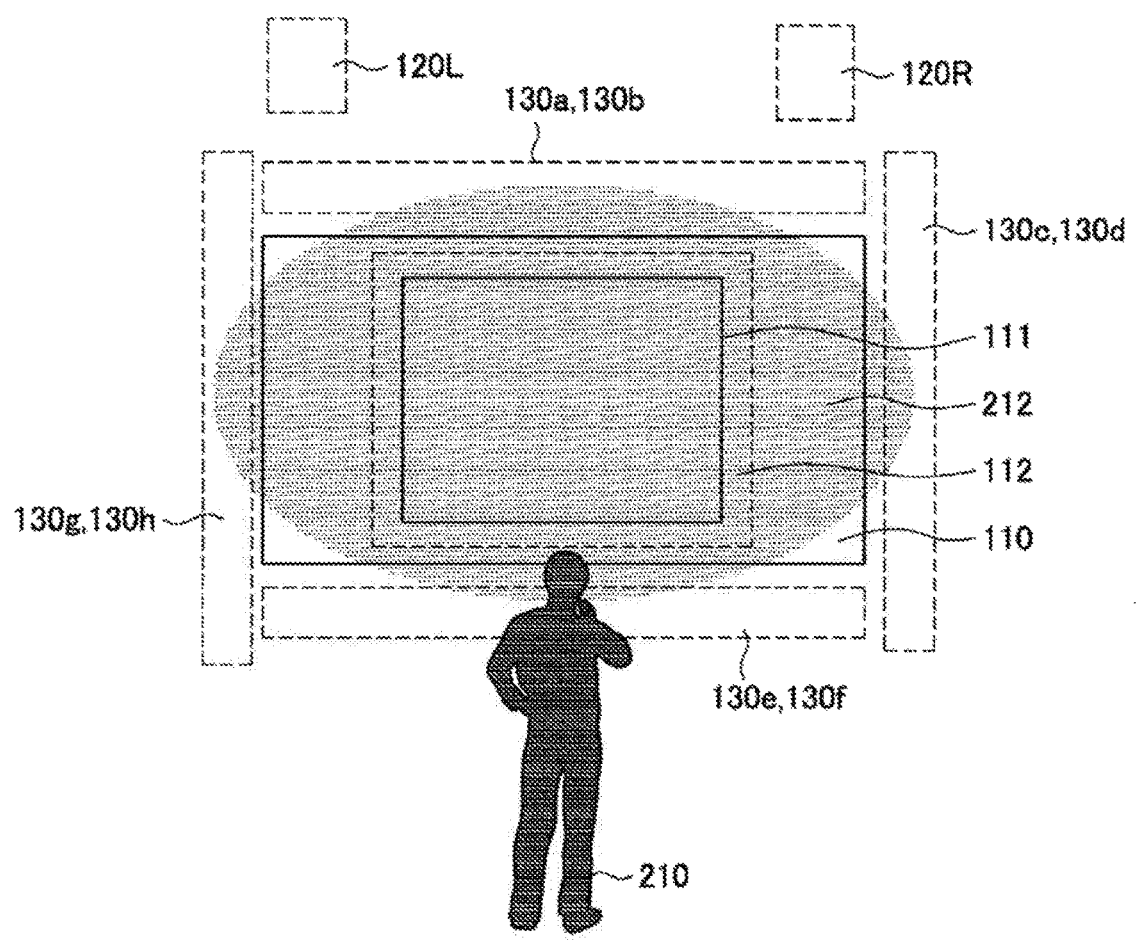
FIG. 11 is a diagram showing an example of a light emission control region set in the light emission control region setting process.

Next, the light emission control region setting process according to the present embodiment will be described in detail with reference to FIGS. 8 to 11. FIG. 8 is a flowchart showing an example of a processing procedure of the light emission control region setting process. FIG. 9 to FIG. 11 are diagrams showings examples of a light emission control region set in the light emission control region setting process. The light emission control region setting process corresponds to the process of Step S105 shown in FIG. 4. In the light emission control region setting process, based on the specified viewing region, for example, as shown in FIG. 2, one portion of the indoor lighting 120 and the ambient lighting 130 as well as the display light emission region 112 within the display region 110 may be set as the light emission control regions.

A processing procedure of the light emission control region setting process will be described with reference to FIG. 8. As shown in FIG. 8, in the light emission control region setting process, first, the display light emission region 112 is decided in the display region 110 based on the viewing region 212 (Step S201). In the process shown in Step S201, a region of a predetermined range around the content display region 111 that overlaps the viewing region 212 is set as the display light emission region 112. The range set as the display light emission region 112 may be decided according to, for example, the control purpose when the light emission control pattern is set in the light emission control pattern setting process. This is because, when the control purpose is, for example, spatial presentation, since it is considered that a more realistic sensation can be provided to the user when light emission control is performed on a broader range, the display light emission region 112 may be set to be relatively broad. On the other hand, when the control purpose is, for example, visibility improvement, the display light emission region 112 may be set to be relatively narrow. When the purpose is visibility improvement, if light emission of a broad range of the light emission control region is controlled, there is a possibility of concentration of the user 210 on the content being interfered with conversely.

When the display light emission region 112 is decided, next, the indoor lighting 120 serving as a control target is set based on the viewing region 212 (Step S203). In the process shown in Step S203, among the indoor lightings 120, a portion that is disposed at a position that is relatively close to the viewing region 212 is selected as the light emission control region. For example, as shown in FIG. 1 and FIG. 2, when the indoor lightings 120L and 120R are provided on the left and right sides above the display region 110, if the viewing region 212 is provided on the left side, the indoor lighting 120L of the left side is set as the light emission control region. When the viewing region 212 is provided on the right side, the indoor lighting 120R of the right side is set as the light emission control region. However, the arrangement of the indoor lighting 120 shown in FIG. 1 and FIG. 2 is an example. When the number of indoor lightings 120 and disposition positions thereof are different from those of the example shown in FIG. 1 and FIG. 2, a portion that is closer to the viewing region 212 among the indoor lightings 120 may be appropriately set as the light emission control region.

Next, it is determined whether the viewing region 212 is within the bezel (Step S205). When it is determined that the viewing region 212 is not within the bezel, that is, when the viewing region 212 overlaps the bezel, the process advances to Step S207, the indoor lighting 120 serving as a control target is set based on the viewing region 212, and the light emission control region setting process ends. On the other hand, when it is determined that the viewing region 212 is within the bezel, that is, when the viewing region 212 does not overlap the bezel, the process shown in Step S207 is omitted, and the light emission control region setting process ends. In this manner, the process shown in Step S205 can be referred to as a process of determining whether the ambient lighting 130 is set as the light emission control region. When the viewing region 212 is included in the bezel, the viewing region 212 and the ambient lighting 130 are considered to be apart, even if light emission of the ambient lighting 130 is controlled, there is a high possibility of an effect thereof not being sufficiently obtained. In the present embodiment, the process shown in Step S205 is performed, necessity of light emission control of the ambient lighting 130 is determined, and implementation of light emission control through which an effect is not easily obtained can be preferably omitted.

In the process shown in Step S207, among the ambient lightings 130, a portion disposed in the vicinity of a portion in which the viewing region 212 and the bezel overlap is selected as the light emission control region. For example, as shown in FIG. 1 and FIG. 2, when the ambient lighting 130 is divided into 8 portions (the ambient lightings 130a to 130h), among the ambient lightings 130a to 130h, a portion that is close to a part in which the viewing region 212 and the bezel overlap is set as the light emission control region. However, the arrangement of the ambient lighting 130 shown in FIG. 1 and FIG. 2 is an example. When the ambient lighting 130 is divided into a number of portions that is different from that of the example shown in FIG. 1 and FIG. 2 and disposed, a portion that is closer to a part in which the viewing region 212 and the bezel overlap may be appropriately set as the light emission control region from among such portions.

FIG. 9 to FIG. 11 show examples of the light emission control region that may be set in the present embodiment. In FIG. 9 to FIG. 11, the user 210 who observes the content display region 111 provided in the display region 110 is shown and a relation between the viewing region 212 and light emission control region is shown. In FIG. 9 to FIG. 11, for simplicity of illustration, the display region 110 and the content display region 111 are mainly shown among configurations of the display system 1 shown in FIG. 2 and the other configurations are not shown. In addition, a region set as the light emission control region is schematically indicated with dashed lines.

FIG. 9 shows a state in which the user 210 observes the content display region 111 at substantially the center of the display region 110 from a position that is relatively close to the display region 110. In this case, the display light emission region 112 is set in a predetermined range around the content display region 111 that overlaps the viewing region 212. In addition, since the viewing region 212 is positioned at substantially the center in a horizontal direction of the display region 110, the indoor lightings 120L and 120R on both the left and right sides are selected as the light emission control regions. In addition, since the viewing region 212 is included in the bezel, the ambient lighting 130 is not selected as the light emission control region. In this manner, in the example shown in FIG. 9, the regions and portions indicated with dashed lines, that is, the display light emission region 112 within the display region 110 and the indoor lightings 120L and 120R, are set as the light emission control region.

FIG. 10 shows a state in which the user 210 observes the content display region 111 at the right end of the display region 110 from a position that is relatively close to the display region 110. In this case, a predetermined range around the content display region 111 that overlaps the viewing region 212 is set as the display light emission region 112. In addition, since the viewing region 212 is positioned further to the right in a horizontal direction of the display region 110, the indoor lighting 120R that is disposed on the right side between the indoor lightings 120L and 120R on the left and right sides is selected as the light emission control region. In addition, since the viewing region 212 overlaps the bezel, the ambient lightings 130c and 130d that are disposed in the vicinity of the overlapping part among the ambient lightings 130 are selected as the light emission control regions. In FIG. 10, while the ambient lightings 130c and 130d are shown as an integral member in a simplified manner for simplicity of illustration, the ambient lightings 130c and 130d may be actually separate members as shown in FIG. 1 and FIG. 2. In this manner, in the example shown in FIG. 10, the regions and portions indicated with dashed lines, that is, the display light emission region 112 within the display region 110, the indoor lighting 120R and the ambient lightings 130c and 130d, are set as the light emission control regions.

FIG. 11 shows a state in which the user 210 observes the content display region 111 at substantially the center of the display region 110 from a position that is relatively far from the display region 110. In this case, as shown in FIG. 11, a relatively broader region, for example, the viewing region 212 that almost covers the display region 110, may be specified. The display light emission region 112 is set in a predetermined range around the content display region 111 that overlaps the viewing region 212. In addition, since the viewing region 212 is positioned at substantially the center in a horizontal direction of the display region 110, the indoor lightings 120L and 120R on both the left and right sides are selected as the light emission control regions. In addition, since the viewing region 212 overlaps almost the entire region of the bezel, the ambient lighting 130 that is disposed in the vicinity of the overlapping part, that is, the whole ambient lighting 130 (the ambient lightings 130a to 130h), is selected as the light emission control region. In FIG. 11, while each of the ambient lightings 130a and 130b, the ambient lightings 130c and 130d, the ambient lightings 130e and 130f and the ambient lightings 130g and 130h is shown as an integral member in a simplified manner for simplicity of illustration, the ambient lightings 130a to 130h may actually be separate members as shown in FIG. 1 and FIG. 2. In this manner, in the example shown in FIG. 11, the regions and portions indicated with dashed lines, that is, the display light emission region 112 within the display region 110, the indoor lightings 120L and 120R and the ambient lightings 130a to 130h, are set as the light emission control regions.

The light emission control region setting process according to the present embodiment has been described above. As described above, according to the present embodiment, the display light emission region 112, the indoor lighting 120 and/or the ambient lighting 130 that are provided around the content display region 111 that overlaps the viewing region 212 may be set as the light emission control targets. Therefore, it is possible to provide a visual effect to the user who observes content that is displayed in the content display region 111 more effectively.

In the present embodiment, as the light emission control region, any of the display light emission region 112 within the display region 110, the indoor lighting 120 and the ambient lighting 130 may be set as the light emission control region, and all thereof may not necessarily be set as the light emission control regions. For example, the display light emission region 112 may not be included in the light emission control region, and the light emission control region may be set from the indoor lighting 120 and/or the ambient lighting 130. Since the display light emission region 112 is one region that is provided within the display region 110, for example, when the position, the number and the size of content display region 111 are changed, the position and the area of the display light emission region 112 are also changed. Therefore, when the content display region 111 is dynamically and sharply changed, the display light emission region 112 is also dynamically and sharply changed accordingly, and there is a possibility of a use sensation of the user decreasing conversely. In this manner, in the present embodiment, light emission control in the display region 110 may not be performed depending on a situation, and light emission control may be performed only for the indoor lighting 120 and/or the ambient lighting 130.

(5. Light Emission Control Pattern Setting Process)

Figure 12:
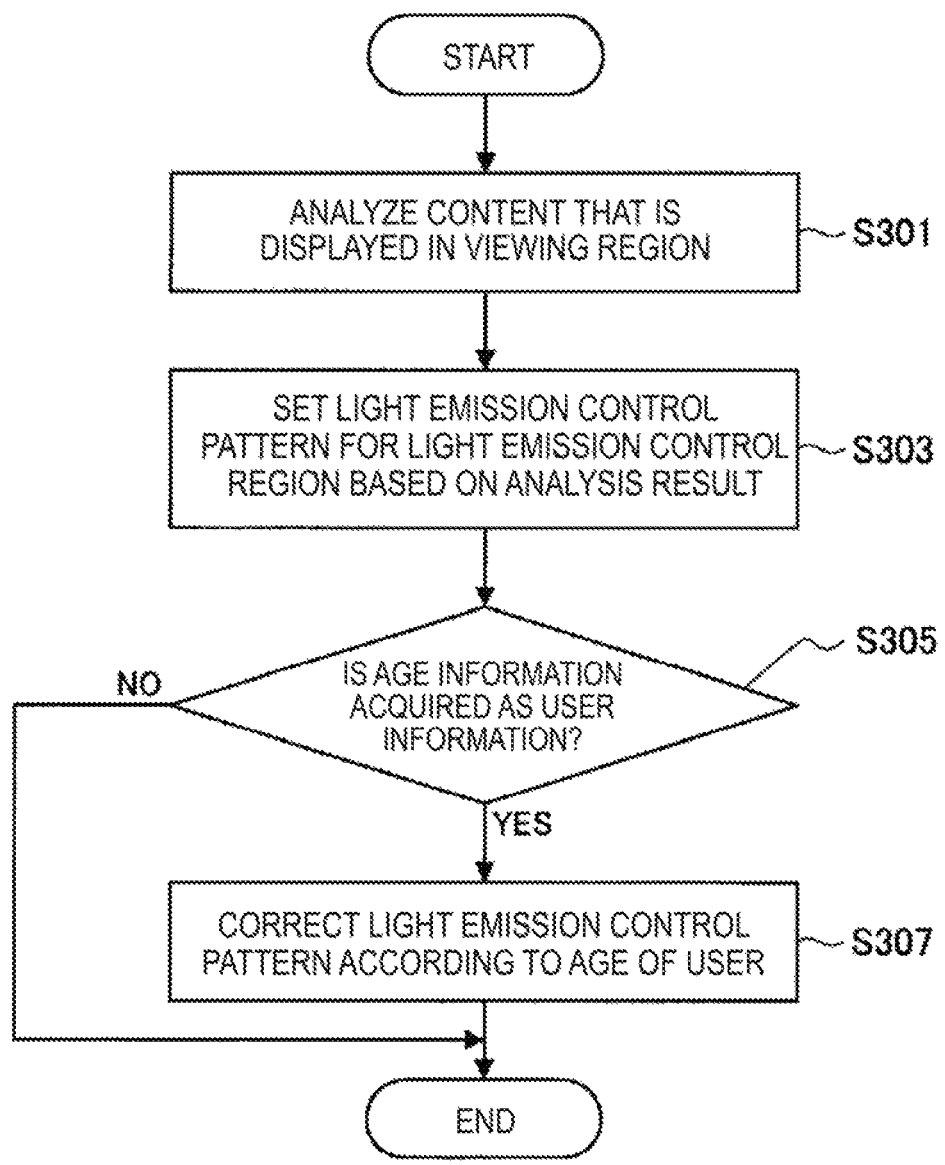
FIG. 12 is a flowchart showing an example of a processing procedure of a light emission control pattern setting process.

Next, the light emission control pattern setting process according to the present embodiment will be described in detail with reference to FIG. 12. FIG. 12 is a flowchart showing an example of a processing procedure of the light emission control pattern setting process. In the light emission control pattern setting process, based on content that is displayed in the specified viewing region, a light emission control pattern for causing the set light emission control region to emit light is set. The light emission control pattern setting process corresponds to the process in Step S107 shown in FIG. 4.

As shown in FIG. 12, in the light emission control pattern setting process, first, content that is displayed in the viewing region 212 is analyzed (Step S301). The process shown in Step S301 corresponds to, for example, the process that is performed in the content analysis unit 344 shown in FIG. 3. In the process shown in Step S301, content that is displayed in the content display region 111 that overlaps the viewing region 212 is analyzed, for example, a type (for example, a movie, an E-book, a news site, and a map) of the content is specified. The type of the content may be specified by analyzing the content that is displayed in the content display region 111 in real time, and may be specified based on metadata associated with the content.

Next, based on the analysis result, a light emission control pattern for the light emission control region set in the light emission control region setting process is set (Step S303). In the process shown in Step S303, for example, light emission control parameters when the display light emission region 112, the indoor lighting 120 and/or the ambient lighting 130 set as the light emission control regions are caused to emit light are set. The following Table 1 shows examples of types of content and light emission control parameters according to the type of the content. In the example shown in Table 1, as light emission control parameters for the indoor lighting 120 and the ambient lighting 130 included in the light emission control region, an RGB value indicating a color and an illuminance (for example, an illuminance based on the user 210 who is within a predetermined distance from the display region 110) that is an index indicating a brightness are shown. The illuminance is represented as a relative ratio with respect to a reference value.

TABLE 1

| Type of content | Ambient lighting | | Indoor lighting | |
|---|---|---|---|---|
| | Color (R/G/B) | Illuminance (%) | Color (R/G/B) | Illuminance (%) |
| News site | White (255, 255, 255) | 90 | White shades (250, 250, 250) | 80 |

TABLE 1-continued

| Type of content | Ambient lighting | | Indoor lighting | |
|---|---|---|---|---|
| | Color (R/G/B) | Illuminance (%) | Color (R/G/B) | Illuminance (%) |
| E-book | White (255, 255, 255) | 90 | White shades (250, 250, 250) | 80 |
| Map (aeronautical chart) | White shades (250, 250, 250) | 80 | White shades (250, 250, 250) | 80 |
| Movie | Orange shades (254, 224, 206) | 50 | OFF | 0 |
| ... | ... | ... | ... | ... |

Table 1 shows examples of the light emission control parameters when the control purpose is visibility improvement. When the control purpose is visibility improvement, light emission control may be performed such that a contrast between a display of the content display region 111 and a region therearound is small. Here, when the contrast is adjusted, a color contrast may be adjusted or a brightness contrast may be adjusted.

When the content is, for example, a news site or an E-book, a display within the content display region 111 is assumed to include a relatively great amount of text. Therefore, in order to enhance visibility of the text for the user, light emission control parameters of the indoor lighting 120 and the ambient lighting 130 that illuminate surroundings thereof may be set such that white light is emitted at a relatively bright illuminance. In addition, when the content is, for example, a movie, a display within the content display region 111 is assumed to change intermittently. Therefore, in order to enhance visibility of the movie for the user, for example, light emission control parameters of the ambient lighting 130 may be set such that colors of the orange shades that are relatively relaxing colors are illuminated at a relatively dark illuminance. In addition, for example, light emission control parameters of the indoor lighting 120 may be set such that light emission is not performed.

For example, as in Table 1, a table showing a relation between types of content and light emission control parameters according to types of the content is stored in a storage unit that may be provided in the display system 1. The light emission control unit 345 refers to the table that is stored in the storage unit, and thus can set the light emission control pattern for the light emission control region according to the content. Table 1 is an example of the table showing light emission control parameters, and different light emission control parameters may be set for each type of content. In addition, in Table 1, light emission control parameters may be appropriately set similarly for other types of content that are not exemplified. In addition, in the example shown in Table 1, while only light emission control parameters for the indoor lighting 120 and the ambient lighting 130 are set in the table, light emission control parameters may be set similarly for the display light emission region 112 within the display region 110 that may be set as the light emission control region according to a type of content.

Further, in the table, light emission control parameters may be set not only for the type of the content but also for more subdivided items. For example, when the content is moving image content, a table such as Table 1 is prepared for each frame or for each group (so-called chapter) of frames of the moving image content. Then, the light emission control unit 345 refers to the table, and thus may set the light emission control pattern for the light emission control region for each frame or for each chapter of the moving image content.

In addition, the light emission control pattern may not be set based on the pre-set table. When content is acquired and selected (when content that is displayed in the display region 110 is selected by the display control unit 343) or for each predetermined time for which content is displayed in the content display region 111, the content is analyzed and the light emission control pattern may be set based on the analysis result. For example, an average value of all contrasts of displays of the content display region 111 is detected when content is acquired and selected or for each predetermined time for which content is displayed, and the light emission control pattern may be set such that a contrast with the surrounding region is suppressed according to the detection result. In addition, for example, an average value of contrasts in specified regions of the content display region 111 is detected when content is acquired and selected or for each predetermined time for which content is displayed, and the light emission control pattern may be set such that a contrast with the surrounding region is suppressed according to the detection result. In addition, for example, a contrast in an edge of the content display region 111 is detected when content is acquired and selected or for each predetermined time for which content is displayed, and the light emission control pattern may be set such that a contrast with the surrounding region is suppressed according to the detection result. In addition, for example, a contrast in an edge of specified regions of the content display region 111 is detected when content is acquired and selected or for each predetermined time for which content is displayed and the light emission control pattern may be set such that a contrast with the surrounding region is suppressed according to the detection result.

When the light emission control pattern is set in Step S303, next, it is determined whether information about an age (age information) of the user 210 is acquired as the user information (Step S305). In the process shown in Step S305, for example, the user information acquired by the user information acquisition unit 341 is analyzed and it is determined whether the age information is included in the user information. For example, the age information may be estimated by analyzing an image of the face of the user 210, and when the user 210 is identified in the face recognition process, may be acquired based on a profile of the user 210 who is registered in advance.

In Step S305, when it is determined that the age information is acquired as the user information, the process advances to Step S307, the light emission control parameters are corrected according to an age of the user, and a display control pattern setting process ends. On the other hand, when it is determined that the age information is not acquired as the user information, the process shown in Step S307 is omitted and the display control pattern setting process ends.

In the process shown in Step S307, for example, as in Table 2, based on a table showing a relation between an age of the user 210 and a correction amount of light emission control parameters, the light emission control parameters set in Step S303 are corrected. In the example shown in Table 2, correction amounts of illuminance set as the light emission control parameters for the indoor lighting 120 and the ambient lighting 130 included in the light emission control region are shown.

TABLE 2

| Age | Ambient lighting Illuminance correction amount (%) | Indoor lighting Illuminance correction amount (%) |
|---|---|---|
| Below age 6 | 90 | 80 |
| Below age 30 | 100 | 100 |
| Below age 50 | 110 | 100 |
| Below age 70 | 120 | 120 |
| Age 70 or older | 130 | 130 |

In humans, it is known that, even when light has the same brightness, the brightness can be differently recognized according to age. For example, it is known that, in order for the elderly to feel the same brightness as youth, about 1.5 times the brightness is necessary in the lighting. In the present embodiment, when the process shown in Step S305 and S307 are performed and an age of the user can be recognized, the light emission control pattern is appropriately corrected according to an age of the user and light emission control is performed for the user more appropriately.

For example, as in Table 2, a table showing a relation between an age of the user 210 and correction amounts of light emission control parameters is stored in a storage unit that may be provided in the display system 1. The light emission control unit 345 refers to the table that is stored in the storage unit and thus can correct the light emission control parameter. Table 2 is an example of the table showing correction amounts for the light emission control parameters. A size of the correction amount, a relation between an age of the user 210 and the correction amount, and the like may be appropriately set based on, for example, a statistical value of measurement values indicating visibility for the plurality of users 210 which are actually measured.

While a case in which the light emission control parameter is corrected according to an age of the user has been described above, the present embodiment is not limited thereto. For example, the light emission control parameter may be corrected based on other information that is included in the user information and considered to be related to perception of a color and brightness of light emission. For example, based on distance information, when the user is in a place that is relatively away from the display region 110, a value indicating a color among the light emission control parameters may be corrected to a value corresponding to a color that is more noticeable among similar colors, and a value indicating brightness may be corrected to a value that increases brightness further.

The light emission control pattern setting process according to the present embodiment has been described above with reference to FIG. 12. As described above, according to the present embodiment, according to the content, the light emission control pattern is set such that, for example, a contrast between a display of the content display region 111 and a region therearound (that is, the light emission control region) is small. Therefore, it is possible to further enhance visibility of the content for the user.

Here, in general, for example, when the user views content such as a movie inside a home, a lighting of the room may be dimmed in order to experience a sense of immersion, and the user may view the content. However, when the lighting of the room is dimmed and the user views the content for a long time (for example, 2 to 3 hours), since a difference between brightness of a display of the content in the screen and the ambient brightness is large, a burden on the user's eyes may be caused. In the present embodiment, light emission of a region therearound is controlled such that a contrast between a display of the content in the content display region 111 and the region therearound is small. Therefore, even if the user views the content for a long time, it is possible to reduce a feeling of fatigue on the user's eyes.

In addition, as a general existing technique for reducing a burden on the user's eyes during viewing of content, for example, a technique of decreasing luminance of a display screen according to brightness of a room was developed. However, in the technique, since luminance of the content itself is reduced, there is a possibility that the user will not be able to sufficiently enjoy the beauty of the content. On the other hand, according to the present embodiment, when light emission of a region therearound is controlled without changing luminance of a display of the content display region 111, a contrast is adjusted and a burden on the user's eyes can be reduced. Therefore, the beauty of the content is not damaged and the user can enjoy the content.

In addition, in the present embodiment, the light emission control pattern set according to the content may be corrected in consideration of light perception by the user based on the user information. Accordingly, it is possible to further increase an effect of improving visibility of content for the user.

Here, while a method of setting the light emission control pattern when the control purpose is visibility improvement has been described above, the present embodiment is not limited thereto. In the present embodiment, light emission control patterns may be set according to other control purposes, for example, physiological effect induction and spatial presentation.

When the control purpose is, for example, physiological effect induction, in the process shown in Step S303, light emission control patterns may be set according to a table such as Table 3. Table 3 shows colors that are light emission control parameters for the display light emission region 112, the indoor lighting 120 and/or the ambient lighting 130 that are included in the light emission control region, and expected effects that are induced in the user according to the colors.

TABLE 3

| Type of content | Colors of light emission control regions | Expected physiological effect |
|---|---|---|
| Education | White shades | Concentration power and ambition |
| Comedy | Yellow shades | Pleasure |
| Food advertisement | Orange shades | Appetite increase |
| ... | ... | ... |

For example, it is known that colors directly influence the human brain and have an effect of promoting secretion of different types of hormones. Images associated with colors are different among people according to past memories and experiences, but secretion of physiological hormones may be a phenomenon that can occur in common among all humans. Therefore, when light emission of the light emission control region is controlled in colors according to the content, it is possible to induce a predetermined physiological effect in the user viewing the content. Therefore, the impression that may be obtained from the content can be stronger. For example, as shown in Table 3, when the content is a food advertisement, a light emission control pattern indicating that the light emission control region set around the content display region 111 on which the content is displayed is caused to emit light with colors of the orange shades may be set. Since colors of orange shades are expected to induce an effect of increasing appetite, it is possible to increase appeal of the advertisement.

For example, as in Table 3, a table showing a relation between types of content and light emission control parameters according to types of the content is stored in a storage unit that may be provided in the display system 1. The light emission control unit 345 refers to the table that is stored in the storage unit, and thus can set the light emission control pattern for the light emission control region according to the content. Table 3 is an example of the table showing the light emission control parameters, and different light emission control parameters may be set according to types of content. In addition, light emission control parameters may be appropriately set similarly for other types of content that are not exemplified in Table 3.

In addition, when the content is moving image content, tag information indicating an effect to be induced in the user may be associated with each frame or each group (so-called chapter) of frames of the moving image content. For example, colors and physiological effects that may be induced in the user according to the colors are prepared in the form of a table, and the light emission control unit 345 acquires information about a color that induces an effect corresponding to the tag information from the table and based on the tag information. Therefore, a color corresponding to the tag information may be set as the light emission control pattern for the light emission control region for each frame or for each chapter of the moving image content.

In addition, when the control purpose is, for example, spatial presentation, in the process shown in Step S303, the light emission control pattern may be set such that spatial presentation that matches content is performed. Light emission control in which spatial presentation is the control purpose may be preferably performed, for example, when the content is content in which spatial presentation using lightings may be performed, for example, a video obtained by imaging a performance such as a concert, live show, or play, or a game. If the control purpose is spatial presentation, for example, when the content is analyzed in Step S301, parameters (for example, changes of colors and brightness of lightings during a performance) indicating a method of controlling lightings in the content may be acquired. Such parameters may be acquired when a video of the content is directly analyzed, or parameters that are associated with the content as metadata of content may be acquired. Then, in Step S303, the parameters obtained by analyzing the content may be set as the light emission control pattern. Light emission control is performed based on the light emission control pattern, and thus lighting control that is performed in the content is artificially reproduced in an actual space. Analysis of the content may be performed, for example, when content is acquired or selected, or may be performed for each predetermined time for which content is displayed in the content display region 111 in real time.

When the content is analyzed, for example, a color and brightness in an edge of the content display region 111 may be detected. In addition, for example, a color and brightness in a predetermined region in the vicinity of substantially the center of the content display region 111 may be detected. In addition, for example, colors and brightness of clothes of a character (for example, an artist, an actor, or an entertainer who performs a performance) in the content may be detected. In addition, for example, after colors and brightness of the content display region 111 are significantly changed, the colors and brightness may be detected. Parameters indicating light emission control obtained based on the analysis result may be set as the light emission control pattern.

When light emission is controlled based on the light emission control pattern set according to the analyzed content, spatial presentation synchronized with changes of a video and sound in the content is performed. For example, in the environment area 140 shown in FIG. 2, spatial presentation of lightings of a performance is reproduced. Accordingly, it is possible to provide a more realistic sensation to the user.

As described above, in the present embodiment, the light emission control pattern may be set according to various control purposes. Accordingly, more appropriate light emission control is performed depending on a demand of a user or a content distributor, and an effect obtained by the light emission control can further increase.

(6. Focus Determination Process)

Figure 13:
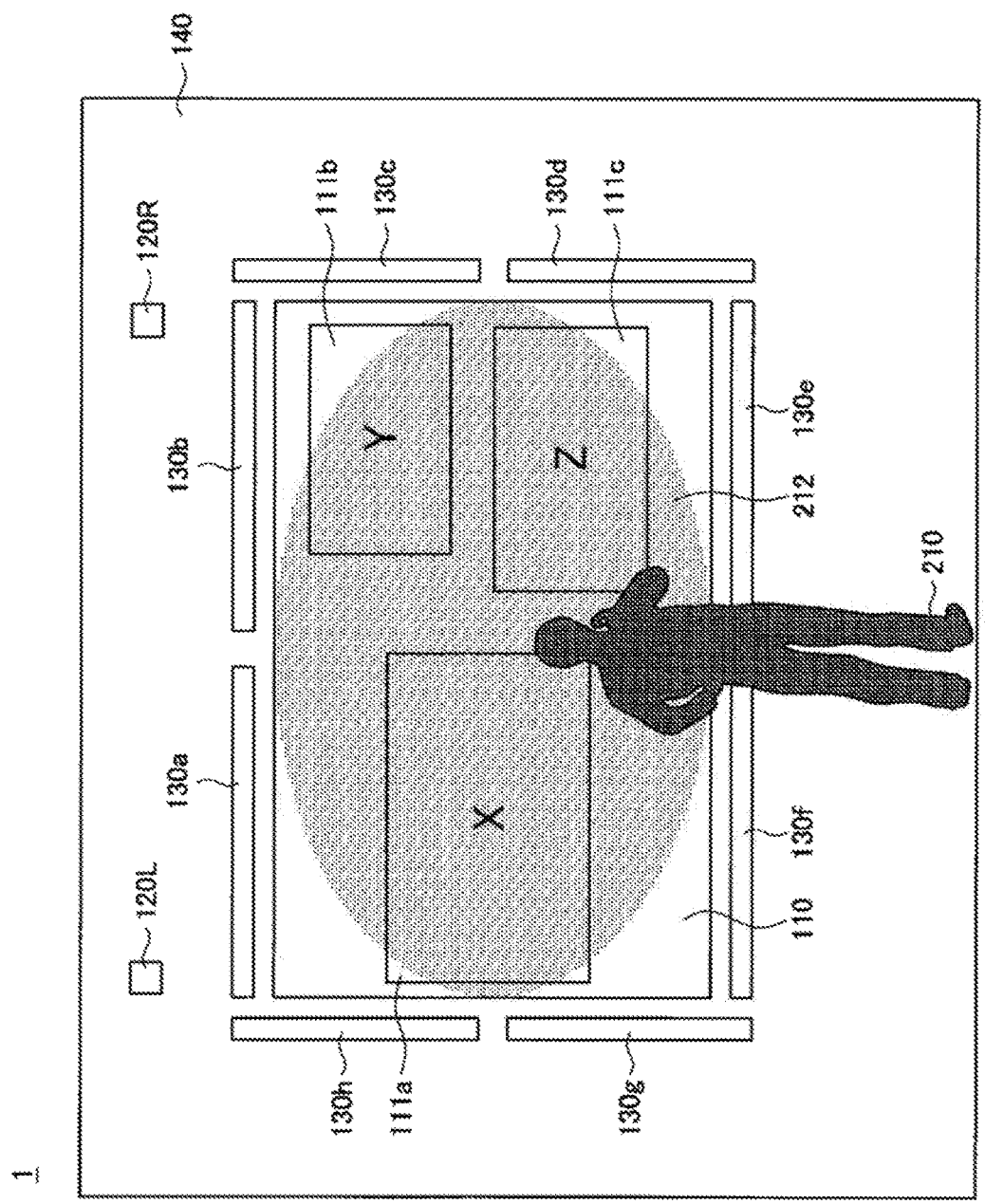
FIG. 13 is an explanatory diagram for describing a case in which displays of a plurality of types of content are included in a viewing region.
Figure 14:
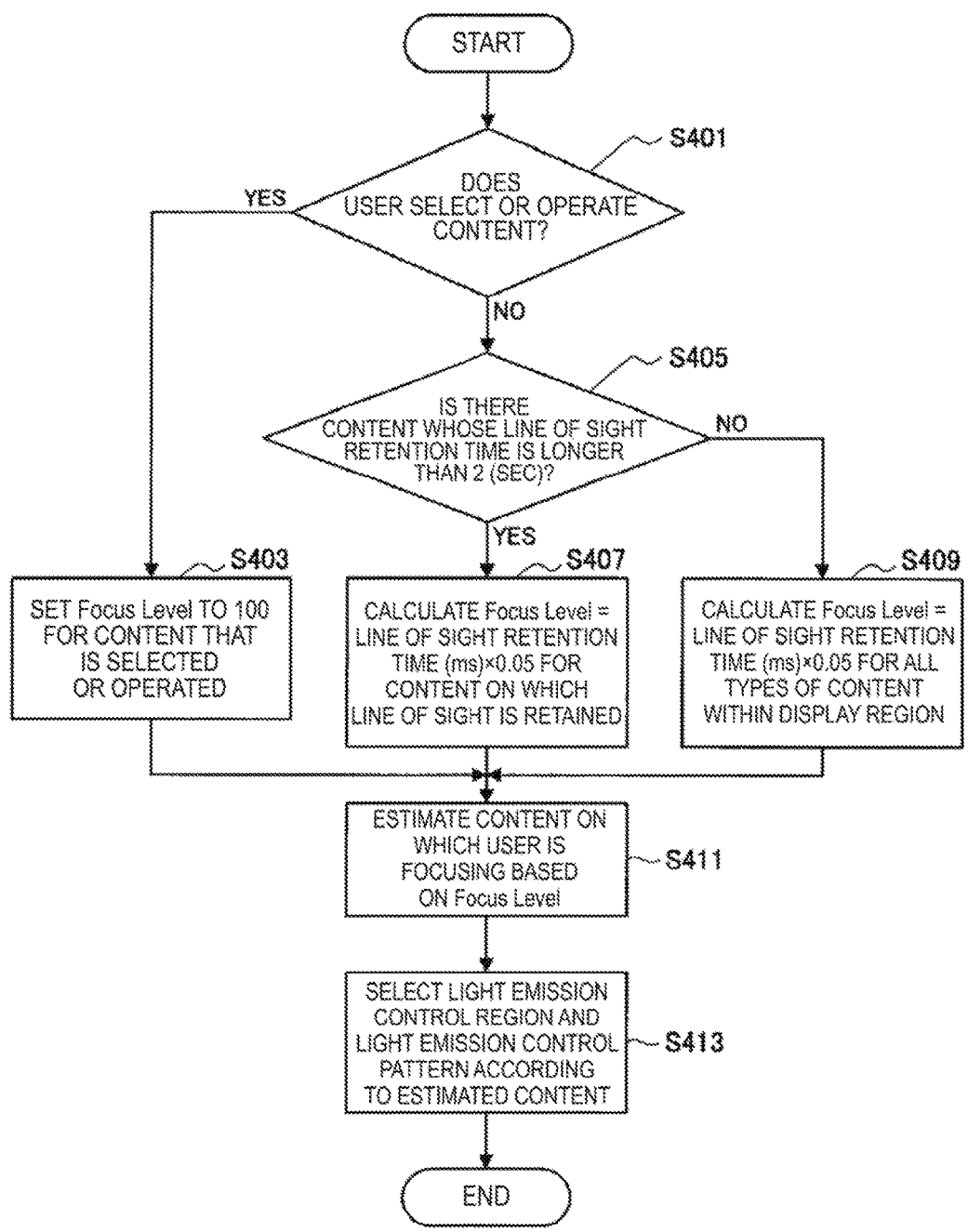
FIG. 14 is a flowchart showing an example of a processing procedure of a focus determination process.

Next, the focus determination process according to the present embodiment will be described in detail with reference to FIG. 13 and FIG. 14. FIG. 13 is an explanatory diagram for describing a case in which displays of a plurality of types of content are included in the viewing region 212. FIG. 14 is a flowchart showing an example of a processing procedure of the focus determination process. The focus determination process corresponds to the process in Step S111 shown in FIG. 4. In addition, since configurations of the display system 1 shown in FIG. 13 are the same as the configurations described with reference to FIG. 2, detailed descriptions thereof will be omitted here.

When displays of a plurality of types of content are included in the viewing region 212, the light emission control region setting process and the light emission control pattern setting process described in the above (4. Light emission control region setting process) and (5. Light emission control pattern setting process) are performed on each type of content within the viewing region 212. Therefore, at a phase in which the process in Step S107 shown in FIG. 4 ends, a plurality of light emission control regions and light emission control patterns may be set for the viewing region 212 of the certain user 210.

In the example shown in FIG. 13, the three content display regions 111a, 111b, and 111c are provided within the display region 110, and the content items X, Y, and Z are displayed in the content display regions 111a, 111b, and 111c, respectively. The user 210 observes the display region 110 at a position that is slightly away, and the viewing region 212 covering the display region 110 is specified. In this case, since displays of the three content items X, Y, and Z are included in the viewing region 212, the light emission control region and the light emission control pattern are set for each of the content items X, Y, and Z.

However, when light emission controls are performed for different light emission control regions at the same time, such controls may compete with each other and there is a possibility of a desired effect not being obtained. On the other hand, even if displays of a plurality of types of content are included in the viewing region 212, content on which the user 210 is focusing at the moment is considered to be one of them. Therefore, when content on which the user 210 is focusing can be estimated, light emission control is preferably performed based on the light emission control region and the light emission control pattern set for the content on which the user is focusing. In the focus determination process according to the present embodiment, content on which the user 210 is focusing is estimated. Based on the estimated result, one light emission control region and one light emission control pattern corresponding to the viewing region 212 may be selected from among a plurality of light emission control regions and a plurality of light emission control patterns set for a plurality of types of content that are displayed within the viewing region 212.

A processing procedure of the focus determination process according to the present embodiment will be described with reference to FIG. 14. In the focus determination process according to the present embodiment, a Focus Level indicating a focus level of the user 210 on content is set or calculated, and content on which the user 210 is focusing is estimated based on the Focus Level.

As shown in FIG. 14, in the focus determination process, first, it is determined whether the user selects or operates any type of content that is displayed in the viewing region 212 (Step S401). In the process shown in Step S401, for example, based on information about an operation input of the user 210 provided from an input unit that may be provided in the display system 1, it may be determined whether the user performs an operation input on specific content through the input unit. When it is determined that the user selected or operated any type of content, the process advances to Step S403, and the Focus Level of the content that is selected or operated is set to 100. In the example shown in FIG. 14, the Focus Level is defined as a value of 0 to 100. Focus Level=100 indicates that the Focus Level has a maximum value. Naturally, this is because content intentionally selected or operated by the user is considered to be content on which the user is focusing.

On the other hand, when it is determined that the user 210 did not select or operate content at all in Step S401, the process advances to Step S405. In the process shown in Step S405, a line of sight retention time for each type of content that is displayed in the viewing region 212 is detected, and it is determined whether there is content whose line of sight retention time is longer than a predetermined time (in the example shown in FIG. 14, 2 (sec)). In the process shown in Step S405, for example, the line of sight retention time may be detected based on information about the viewing region 212 provided from the viewing region specifying unit 342 shown in FIG. 3, information about the arrangement of the content display region 111 within the display region 110 provided from the display control unit 343, and line of sight information included in the user information provided from the user information acquisition unit 341. The line of sight retention time may be detected as a time for which a line of sight is continuously retained or detected as a total value of times for which a line of sight is intermittently retained.

When it is determined that there is content whose line of sight retention time for content is longer than a predetermined time, the process advances to Step S407, and the Focus Level is calculated as, for example, "line of sight retention time (ms)×0.05," for content on which the line of sight is retained. This is because content whose line of sight retention time is longer than a predetermined time can be considered as content on which the user 210 is focusing. When there are a plurality of types of content whose line of sight retention times are longer than a predetermined time, the Focus Level may be similarly calculated for corresponding types of content.

On the other hand, when it is determined that there is no content whose line of sight retention time for content is longer than a predetermined time in Step S405, the process advances to Step S409, and the Focus Level is calculated as, for example "line of sight retention time (ms)×0.05," for all types of content within the display region 110. In this case, since it is not possible to estimate content on which the user is focusing from information about an operation input of the user 210 and the line of sight retention time derived from the user information, the Focus Level for all types of content within the display region 110 may be calculated based on a predetermined calculation formula.

When the process shown in Step S403, Step S407 or Step S409 ends, the process advances to Step S411. In the process shown in Step S411, content on which the user 210 is focusing is estimated based on the Focus Level. In Step S403, when the Focus Level for content that is selected or operated by the user 210 is set to 100, the content is estimated as content on which the user 210 is focusing. In addition, in Step S407, when the Focus Level for content on which a line of sight is retained for a predetermined time or longer is calculated, if the number of types of content on which a line of sight is retained for a predetermined time or longer is only one, the content is estimated as content on which the user 210 is focusing. On the other hand, when there are a plurality of types of content on which a line of sight is retained for a predetermined time or longer, the Focus Levels calculated for the types of content are compared, and content having the greatest Focus Level is estimated as content on which the user 210 is focusing. In addition, in Step S409, when the Focus Levels are calculated for all types of content within the viewing region 212, the Focus Levels calculated for the types of content are compared, and content having the greatest Focus Level is estimated as content on which the user 210 is focusing.

Next, among a plurality of light emission control regions and a plurality of light emission control patterns set for a plurality of types of content included in the viewing region 212, a light emission control region and a light emission control pattern according to the content on which the user 210 is estimated to be focusing are selected (Step S413), and the focus determination process ends.

The focus determination process according to the present embodiment has been described above with reference to FIG. 13 and FIG. 14. As described above, according to the present embodiment, when displays of a plurality of types of content are included in the viewing region 212, content on which the user 210 is focusing is estimated based on information about an operation input of the user 210 and/or line of sight information of the user, and a light emission control region and a light emission control pattern according to the estimated content are selected. In addition, when content on which the user 210 is focusing is estimated, it is performed based on, for example, a line of sight retention time for content. Therefore, not only content that is intentionally selected or operated by the user but also content toward which a line of sight of the user 210 is unintentionally directed may be preferably estimated as content on which the user is focusing. Therefore, even if displays of a plurality of types of content are included in the viewing region 212, it is possible to perform light emission control more appropriately according to content on which the user 210 is focusing.

The maximum value of the Focus Level and the method of calculating the Focus Level described above are only examples, and the present embodiment is not limited thereto. The Focus Level may be any index that indicates a focus level of the user 210 on content, and a specific definition and a calculation method thereof may be arbitrarily set. In addition, while a case in which information about an operation input and/or line of sight information of the user are used to estimate content on which the user 210 is focusing has been described above, the present embodiment is not limited thereto. In the present embodiment, any piece of information may be used to estimate content on which the user is focusing. In addition, content on which the user is focusing may be estimated, for example, in consideration of a focus level for content that may be calculated from a plurality of different types of information in a composite manner.

(7. Light Emission Control Adjustment Process)

Figure 15:
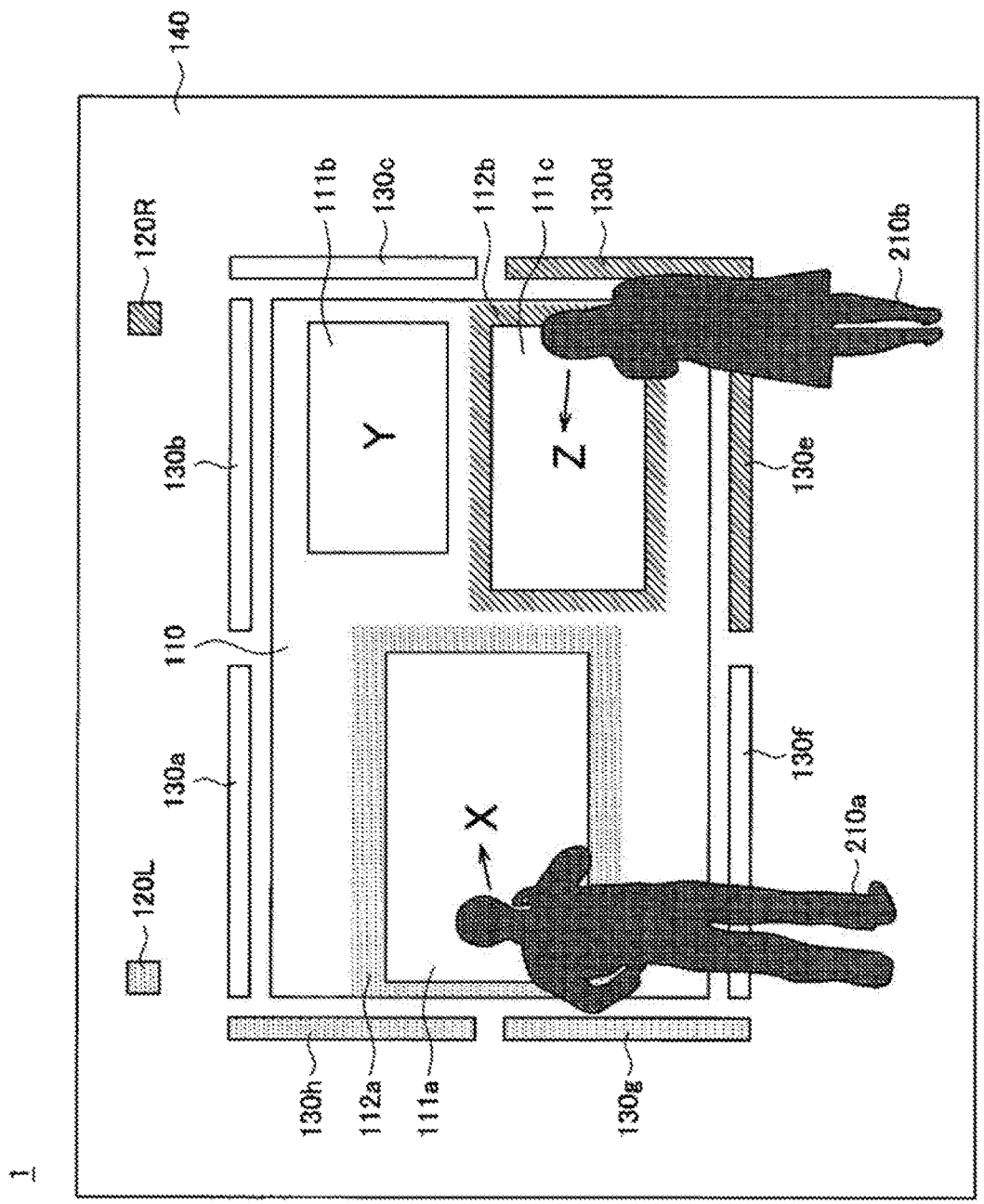
FIG. 15 is an explanatory diagram for describing a case in which there are a plurality of users in front of a display region.
Figure 16:
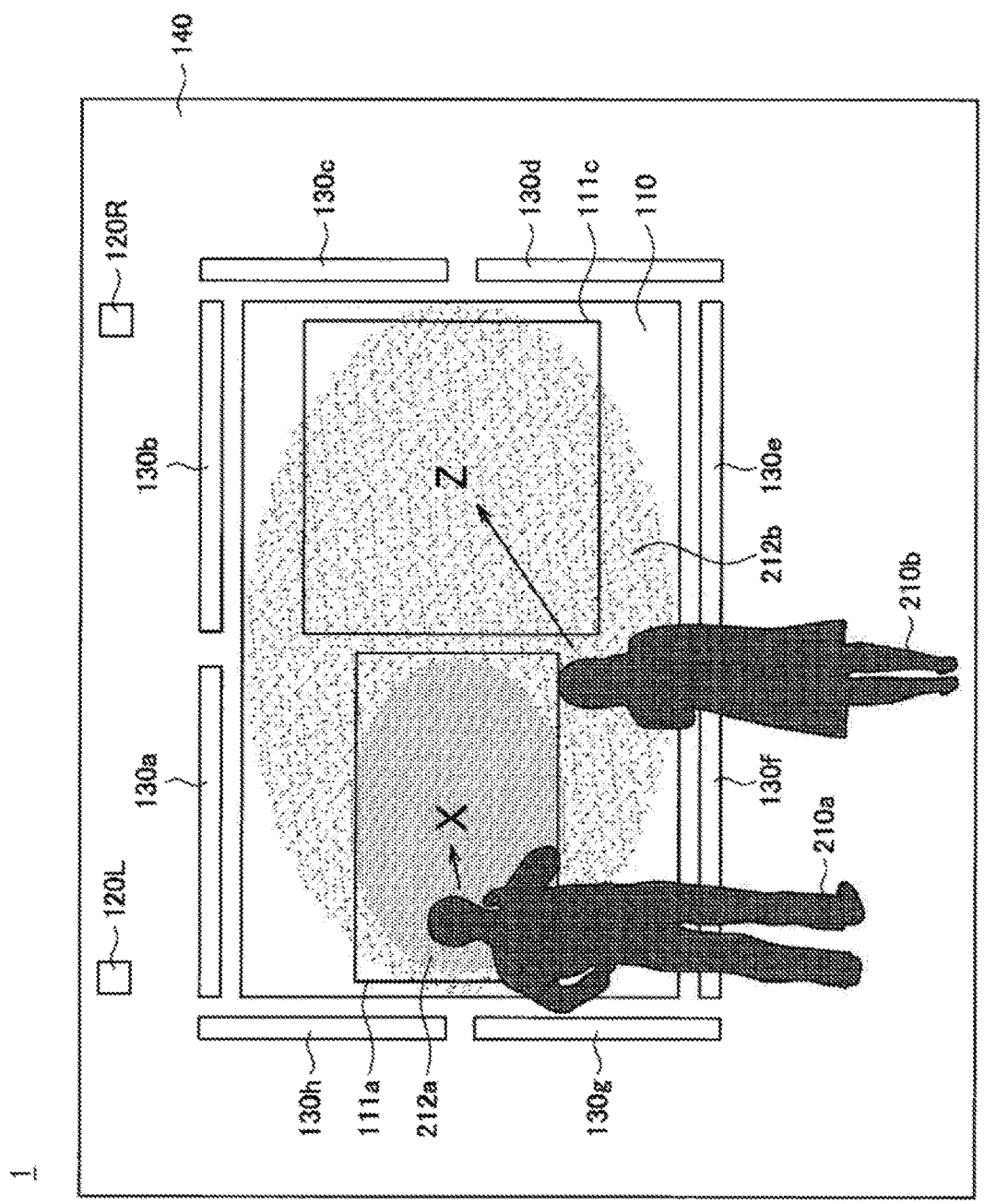
FIG. 16 is an explanatory diagram for describing a case in which there are a plurality of users in front of a display region.
Figure 17:
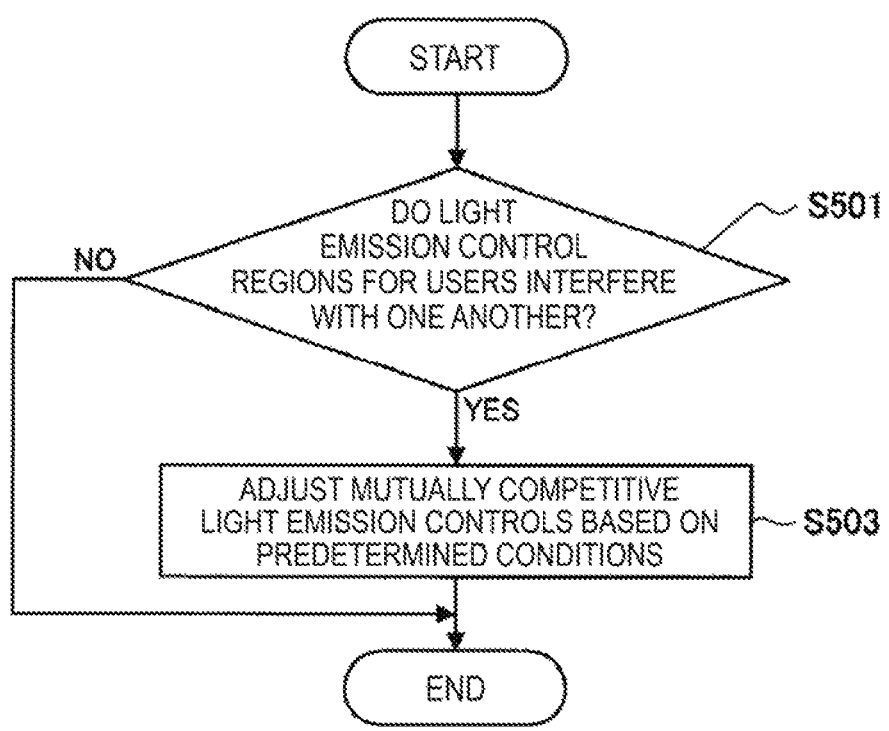
FIG. 17 is a flowchart showing an example of a processing procedure of a light emission control adjustment process.

Next, the light emission control adjustment process according to the present embodiment will be described in detail with reference to FIG. 15 to FIG. 17. FIG. 15 and FIG. 16 are explanatory diagrams for describing when there are a plurality of users in front of the display region 110. FIG. 17 is a flowchart showing an example of a processing procedure of the light emission control adjustment process. The light emission control adjustment process corresponds to the process in Step S115 shown in FIG. 4. In addition, since configurations of the display system 1 shown in FIG. 15 and FIG. 16 are the same as configurations described with reference to FIG. 2, details thereof will be omitted here.

When there are a plurality of users in front of the display region 110, the light emission control region setting process, the light emission control pattern setting process and the focus determination process described in the above (4. Light emission control region setting process), (5. Light emission control pattern setting process) and (6. Focus determination process) are performed for each of the users. Accordingly, at a phase in which the process of Step S111 shown in FIG. 4 ends, a plurality of light emission control regions and light emission control patterns may be set for the plurality of users.

In the example shown in FIG. 15, the three content display regions 111a, 111b, and 111c are provided within the display region 110, and the content items X, Y, and Z are displayed in the content display regions 111a, 111b, and 111c, respectively. The two users 210a and 210b observe the display region 110. The user 210a observes the content display region 111a at a relatively close position. Similarly, the user 210b observes the content display region 111c at a relatively close position.

For the users 210a and 210b, viewing regions are specified and light emission control regions and light emission control patterns may be set. In the example shown in FIG. 15, since the users 210a and 210b observe the content display regions 111a and 111c, respectively, at relatively close positions to the display region 110, the light emission control regions do not interfere with each other. Therefore, as shown in FIG. 15, light emission controls may be independently performed based on the light emission control region and the light emission control pattern set for each of the users 210a and 210b.

For example, for the user 210a, the light emission control region (the display light emission region 112a around the content display region 111a, the indoor lighting 120L, and the ambient lightings 130g and 130h) set based on the viewing region of the user 210a is caused to emit light using the light emission control pattern according to the content item X that is displayed in the content display region 111a. In addition, for example, for the user 210b, the light emission control region (the display light emission region 112b around the content display region 111c, the indoor lighting 120R, and the ambient lightings 130d and 130e) set based on the viewing region of the user 210b is caused to emit light using the light emission control pattern according to the content item Z that is displayed in the content display region 111c.

On the other hand, in the example shown in FIG. 16, the two content display regions 111a and 111c are provided within the display region 110, and the content items X and Z are displayed in the content display regions 111a and 111c, respectively. The two users 210a and 210b observe the display region 110. The user 210a observes the content display region 111a at a relatively close position. The user 210b observes the content display region 111c at a relatively far position.

For the users 210a and 210b, viewing regions are specified and light emission control regions and light emission control patterns may be set. FIG. 16 shows the viewing regions 212a and 212b of the users 210a and 210b, respectively. In the example shown in FIG. 16, since the user 210a is positioned at a place that is relatively close to the display region 110, and the user 210b is positioned at a place that is relatively apart from the display region 110, the viewing regions 212a and 212b overlap. In this case, the light emission control region set for the user 210a and the light emission control region set for the user 210b overlap, and light emission controls for both light emission control regions may be mutually competitive. Therefore, in the light emission control adjustment process according to the present embodiment, a process of adjusting mutually competitive light emission controls may be performed based on predetermined conditions.

A processing procedure of the light emission control adjustment process according to the present embodiment will be described with reference to FIG. 17. As shown in FIG. 17, in the light emission control adjustment process, first, it is determined whether light emission control regions for users interfere with one another (Step S501). When it is determined that light emission control regions do not interfere with one another (the case exemplified in FIG. 15), since it is unnecessary to adjust light emission controls for such light emission control regions, the light emission control adjustment process ends. In Step S117 shown in FIG. 4, light emission controls may be independently performed based on the light emission control region and the light emission control pattern set for each user.

On the other hand, in Step S501, when it is determined that the light emission control regions interfere with one another (the case exemplified in FIG. 16), mutually competitive light emission controls are adjusted based on predetermined conditions (Step S503). Here, when the light emission control is adjusted, for example, any or a combination of a plurality of following processes may be performed.

For example, a light emission control region of a user who starts viewing at an earlier time may have priority. In addition, for example, when an owner of the display system 1 is registered in advance, a light emission control region of a user corresponding to the owner may have priority. In such processes, a plurality of users may be distinguished based on, for example, identification information according to the face recognition process, which is included in the user information.

In addition, for example, a light emission control region of a user who is closer to the display region 110 may have priority.

In addition, for example, when an age of each user is acquired as the user information, a light emission control region of a user whose age is high may have priority. Since a user whose age is high tends to have a low viewing ability, light emission control is preferentially performed for an elderly user, and thus visibility for the elderly user is improved.

In addition, for example, the priority may be determined according to a type of content that each user observes. Specifically, the priority may be appropriately set according to a type of content, for example, light emission control for a display screen of a Web browser has priority over a movie.

In addition, for example, based on a viewing history of the user, a light emission control region corresponding to a user who views content that is considered to be strongly preferred may have priority. For example, in a storage unit that may be provided in the display system 1, information about a content viewing history of the user is stored, and user preference may be analyzed in other functions in the light emission control unit 345 or the control unit 340. The light emission control unit 345 can perform the light emission control adjustment process based on the user preference described above based on information about the analyzed user preference.

In addition, when the display region 110 includes a combination of a plurality of display devices (for example, a display device and a projector), light emission control regions may be set across such a plurality of display devices. In this case, for example, a light emission control region whose percentage in a display device (for example, a display apparatus) set as a main device is higher may have priority.

In addition, for example, the priority may be determined according to the control purpose. For example, when a light emission control region and a light emission control pattern for a certain user are set to provide a presentation effect as the control purpose and a light emission control region and a light emission control pattern for another user are set to provide visibility improvement as the control purpose, reducing a burden on eyes is given more importance and the light emission control region set to provide visibility improvement as the control purpose may have priority. Further, when the light emission control regions and the light emission control patterns for both users are set to provide visibility improvement as the control purpose, both of the light emission control patterns are compared, and light emission control may be preferentially performed based on a light emission control pattern region and a light emission control region that are considered to have a greater contrast suppression effect.

In addition, for example, a position and a size of the content display region are adjusted such that light emission control regions do not overlap, and thus light emission control may be adjusted. For example, in a range in which a use sensation of the user is not significantly reduced, a position of the content display region is moved and a size of the content display region is reduced so that the position and the size of the light emission control region may be adjusted not to interfere with one another.

In addition, for example, a size of the display light emission region that is a light emission control region within the display region 110 may be appropriately adjusted such that the light emission control regions do not interfere with one another.

In addition, for example, a region in which the light emission control region overlap may be displayed in a mixed color such as a gradation display based on both of the light emission control patterns.

In Step S503, when the above-described adjustment process is performed, a method of controlling light emission that may be performed on the display region 110 (that is, the light emission control region and the light emission control pattern) is finally decided.

The light emission control adjustment process according to the present embodiment has been described above with reference to FIG. 15 to FIG. 17. As described above, according to the present embodiment, when there are a plurality of users in front of the display region 110 and light emission control regions set for the users interfere with one another, a process of adjusting light emission control regions and light emission control patterns set for the plurality of users is performed based on predetermined conditions. Therefore, even if light emission controls for the plurality of users are mutually competitive, adjustment is appropriately performed thereon, and light emission control is performed without decreasing a use sensation of each user more than necessary.

(8. Hardware Configuration)

Figure 18:
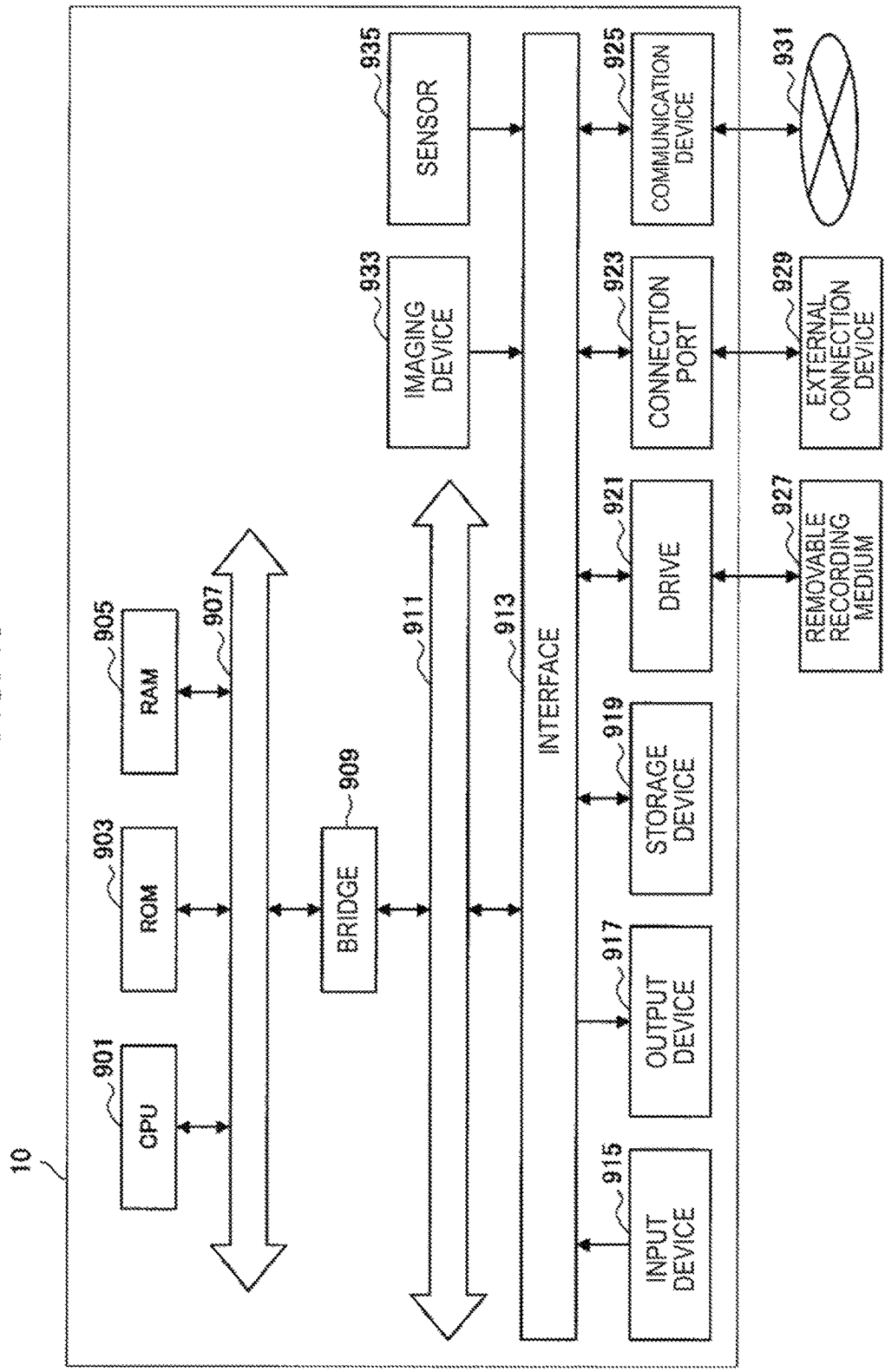
FIG. 18 is a block diagram showing an example of a hardware configuration of a display system according to the present embodiment.

Next, a hardware configuration of a display system according to an embodiment will be described with reference to FIG. 18. FIG. 18 is a block diagram showing an example of the hardware configuration of the display system according to an embodiment. The illustrated display system 900 can realize, for example, a configuration of the display system 1 of the above-described embodiments.

The display system 900 includes a CPU 901, ROM (Read Only Memory) 903, and RAM (Random Access Memory) 905. In addition, the display system 900 may include a host bus 907, a bridge 909, an external bus 911, an interface 913, an input device 915, an output device 917, a storage device 919, a drive 921, a connection port 923, a communication device 925, an imaging device 933 and a sensor 935 as necessary. The display system 900 may include a processing circuit such as a DSP or ASIC (Application Specific Integrated Circuit), alternatively or in addition to the CPU 901.

The CPU 901 serves as an arithmeticprocessor and a controller, and controls all or some operations in the display system 900 in accordance with various programs recorded in the ROM 903, the RAM 905, the storage device 919 or a removable recording medium 927. The ROM 903 stores programs and arithmetic parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909. In the present embodiment, the CPU 901 is implemented as the control unit 340 shown in FIG. 3, as an example.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the display system 900. Furthermore, the input device 915 includes an input control circuit which generates an input signal on the basis of the information which is input by a user and outputs the input signal to the CPU 901. By operating the input device 915, a user can input various types of data to the display system 900 or issue instructions for causing the display system 900 to perform a processing operation. In the present embodiment, for example, the user can adjust the arrangement (such as a size, a position, and the number thereof) of the content display region 111 in the display region 110 through the input device 915, and select content that is displayed in the content display region 111.

The output device 917 includes a device capable of visually or audibly notifying the user of acquired information. The output device 917 may include a display device such as an LCD, a PDP (Plasma Display Panel), an organic EL displays, a lamp, and a lighting, an audio output device such as a speaker or a headphone, and a peripheral device such as a printer. The output device 917 may output the results obtained from the process of the display system 900 in a form of a video such as text or an image, and an audio such as voice or sound. In the present embodiment, the display device corresponds to, for example, the display device 110 (the display region 110), the indoor lighting 120, the ambient lighting 130, the display unit 320 and the illumination unit 330 shown in FIG. 1 and FIG. 3. In addition, in the present embodiment, for example, audio according to content may be output from the audio output device.

The storage device 919 is a device for data storage which is configured as an example of a storage unit of the display system 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside. In the present embodiment, for example, the storage device 919 can store various types of information that are processed by the control unit 340 shown in FIG. 3 and various processing results obtained by the control unit 340. For example, the storage device 919 can store the content information, the user information, a table indicating light emission control parameters used when the light emission control pattern is set and correction amounts thereof, and the like.

The drive 921 is a reader/writer for the removable recording medium 927 such as a magnetic disk, an optical disk, a magneto-optical disk, or a semiconductor memory, and is embedded in the display system 900 or attached externally thereto. The drive 921 reads information recorded in the removable recording medium 927 attached thereto, and outputs the read information to the RAM 905. Further, the drive 921 writes in the removable recording medium 927 attached thereto. In the present embodiment, for example, the drive 921 can read various types of information that are processed by the control unit 340 shown in FIG. 3 and various processing results obtained by the control unit 340 from the removable recording medium 927 and write them in the removable recording medium 927.

The connection port 923 is a port used to directly connect devices to the display system 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the display system 900 and the external connection device 929. In the present embodiment, for example, various types of information that are processed by the control unit 340 shown in FIG. 3 and various processing results obtained by the control unit 340 may be transmitted to and received from the external connection device 929 through the connection port 923.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like. In the present embodiment, for example, the communication device 925 may transmit and receive various types of information that are processed by the control unit 340 shown in FIG. 3 and various processing results obtained by the control unit 340 to and from another external device through the communication network 931.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images. In the present embodiment, the imaging device 933 is implemented as the imaging device 150 and the imaging unit 310 shown in FIGS. 1 and 3, as an example.

The sensor 935 is any of various sensors such as an acceleration sensor, a gyro sensor, a geomagnetic sensor, an optical sensor, a sound sensor, or a distance sensor, for example. The sensor 935 acquires information regarding the state of the display system 900, such as the orientation of the case of the display system 900, as well as information regarding the environment surrounding the display system 900, such as the brightness or noise surrounding the display system 900, for example. The sensor 935 may also include a Global Positioning System (GPS) sensor that receives GPS signals and measures the latitude, longitude, and altitude of the apparatus. In the present embodiment, for example, based on the detection result obtained by the sensor 935, the user information may be acquired by the user information acquisition unit 341 shown in FIG. 3. For example, when the sensor 935 is a distance measuring sensor, a distance from the display region to the user, which is detected by the distance measuring sensor, may be acquired by the user information acquisition unit 341 as the user information.

The foregoing thus illustrates an exemplary hardware configuration of the display system 900. Each of the above components may be realized using general-purpose members, but may also be realized in hardware specialized in the function of each component. Such a configuration may also be modified as appropriate according to the technological level at the time of the implementation.

It is possible to create a computer program used to implement each function of the display system 900 as described above and to install the computer program in PC or the like. It is also possible to provide a computer readable recording medium that stores such computer program therein. An example of the recording medium includes a magnetic disk, an optical disk, a magneto-optical disk, and flash memory. The computer program described above may be delivered via a network without use of the recording medium.

(9. Supplement)

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

For example, while a case in which the display system 1 is arranged in a room has been described in the above embodiments, the present technology is not limited thereto. For example, the configuration of the display system 1 according to the present embodiment may be applied to a large display device that is arranged outdoors.

Additionally, the present technology may also be configured as below.

(1) An information processing device including:

a user information acquisition unit configured to acquire user information based on a state of a user who views a display region; and a light emission control unit configured to control light emission of a light emission control region around a content display region that is a region in which content is displayed within the display region based on the user information.

(2) The information processing device according to (1), wherein the light emission control unit controls light emission of the light emission control region according to the content that is displayed in the content display region.

(3) The information processing device according to (2), further including a viewing region specifying unit configured to specify a viewing region that is a region that the user views in the display region based on the user information.

(4) The information processing device according to (3), wherein the viewing region specifying unit specifies the viewing region based on at least any of information about a position of a user with respect to the display region and information about a line of sight of a user, which are included in the user information.

(5) The information processing device according to (4), wherein the viewing region specifying unit specifies the viewing region based on a color discrimination region that is a region in which the user is able to discriminate a color in the display region.

(6) The information processing device according to (5), wherein the viewing region specifying unit further sets a region serving as a predetermined margin for the color discrimination region and thus specifies the viewing region.

(7) The information processing device according to any one of (1) to (6), wherein the light emission control unit sets at least any of at least one portion of an ambient lighting that is provided to surround a periphery of the display region and at least one portion of an indoor lighting that is provided above the display region and is provided to illuminate at least a predetermined range on a front side of the display region as the light emission control region based on a viewing region that is a region that the user views in the display region.

(8) The information processing device according to (7), wherein, when the viewing region and a bezel of the display region overlap, the light emission control unit sets a portion that is positioned in the vicinity of the overlapping portion within the ambient lighting as the light emission control region.

(9) The information processing device according to any one of (1) to (8), wherein the light emission control unit sets a display light emission region that is a region of a predetermined range around the content display region corresponding to the content that is displayed in the viewing region that is a region that the user views within the display region, as the light emission control region.

(10) The information processing device according to any one of (1) to (9), wherein the light emission control unit sets a light emission control pattern of the light emission control region in a manner that a difference of a contrast between a display of the content display region and the light emission control region decreases.

(11) The information processing device according to any one of (1) to (9), wherein the light emission control unit sets a light emission control pattern of the light emission control region in a manner that the light emission control region is caused to emit light with colors that induce a physiological effect associated with the content in the user.

(12) The information processing device according to any one of (1) to (9), wherein the light emission control unit sets a light emission control pattern of the light emission control region in a manner that lighting control in the content is reproduced in an actual space.

(13) The information processing device according to any one of (10) to (12), wherein the light emission control unit sets the light emission control pattern according to a type of the content.

(14) The information processing device according to any one of (10) to (12), wherein the light emission control unit analyzes a display of the content in the content display region as needed and thus sets the light emission control pattern.

(15) The information processing device according to any one of (1) to (14), wherein, when displays of a plurality of pieces of the content are included in a viewing region that is a region that the user views in the display region, the light emission control unit selects one light emission control region and one light emission control pattern corresponding to the viewing region from among a plurality of light emission control patterns set for a plurality of the light emission control regions and the light emission control regions set for each piece of the content.

(16) The information processing device according to (15), wherein the light emission control unit estimates a piece of content on which the user is focusing from among a plurality of pieces of the content included in the viewing region, and selects the light emission control region and the light emission control pattern set for the estimated piece of content as the light emission control region and the light emission control pattern corresponding to the viewing region.

(17) The information processing device according to (16), wherein the light emission control unit estimates a piece of content on which the user is focusing based on whether the user performs an operation input on the content.

(18) The information processing device according to any one of (1) to (17), wherein, when a plurality of the light emission control regions set for a plurality of the users interfere with one another, the light emission control unit adjusts mutually competitive light emission controls based on a predetermined condition.

(19) An information processing method including:

acquiring, by a processor, user information based on a state of a user who views a display region; and controlling, by a processor, light emission of a light emission control region around a content display region that is a region in which content is displayed within the display region based on the user information.

(20) A program causing a processor of a computer to execute:

a function of acquiring user information based on a state of a user who views a display region; and a function of controlling light emission of a light emission control region around a content display region that is a region in which content is displayed within the display region based on the user information.

REFERENCE SIGNS LIST 1 display system
110 display device (display region)
111 content display region
112 display light emission region
120 indoor lighting
130 ambient lighting
140 environment area
150 imaging device
210 user
211 color discrimination region
212 viewing region
310 imaging unit
320 display unit
330 illumination unit
340 control unit
341 user information acquisition unit
342 viewing region specifying unit
343 display control unit
344 content analysis unit
345 light emission control unit

The invention claimed is:

1. An information processing device, comprising:
at least one processor configured to:
acquire user information based on a state of a user who views a display region;
control, based on the acquired user information, light emission of a light emission control region around a content display region; and
specify a viewing region in the display region based on at least one of information of a position of the user with respect to the display region or information of a line of sight of the user,
wherein the content display region displays content within the display region.

2. The information processing device according to claim 1, wherein the at least one processor is further configured to control the light emission of the light emission control region, based on the content.

3. The information processing device according to claim 2, wherein the at least one processor is further configured to:
specify the viewing region in the display region based on the acquired user information,
wherein the user views the viewing region in the display region.

4. The information processing device according to claim 1, wherein the at least one processor is further configured to specify the viewing region based on a color discrimination region in the display region.

5. The information processing device according to claim 4, wherein the at least one processor is further configured to:
set a margin region for the color discrimination region; and
specify the viewing region based on the set margin region.

6. The information processing device according to claim 1,
wherein the at least one processor is further configured to set, as the light emission control region, at least one of:
at least one portion of an ambient lighting that surrounds a periphery of the display region; or
at least one portion of an indoor lighting that is above the display region and illuminates at least an area on a front side of the display region, and
wherein the user views the viewing region.

7. The information processing device according to claim 6, wherein the at least one processor is further configured to set, as the light emission control region, a display light emission region around the content display region.

8. The information processing device according to claim 1,
wherein the user views the viewing region in the display region,
wherein an ambient lighting surrounds a periphery of the display region,
wherein the viewing region and a bezel of the display region overlap,
wherein the at least one processor is further configured to set, as the light emission control region, a first portion within the ambient lighting, and
wherein the first portion is in vicinity of an overlapping portion.

9. The information processing device according to claim 1, wherein the at least one processor is further configured to set a light emission control pattern of the light emission control region such that a difference of a contrast between the content display region and the light emission control region decreases.

10. The information processing device according to claim 9, wherein the at least one processor is further configured to set the light emission control pattern, based on a type of the content.

11. The information processing device according to claim 9,
wherein the at least one processor is further configured to:
analyze the displayed content; and
set the light emission control pattern based on the analyzed content.

12. The information processing device according to claim 1, wherein the at least one processor is further configured to set a light emission control pattern of the light emission control region such that the light emission control region emits light with color effects.

13. The information processing device according to claim 1, wherein the at least one processor is further configured to set a light emission control pattern of the light emission control region such that lighting control in the content is reproduced in an actual space.

14. The information processing device according to claim 1,
wherein the user views the viewing region in the display region,
wherein the viewing region includes a plurality of pieces of the displayed content,
wherein the at least one processor is further configured to select, one light emission control region and one light emission control pattern, corresponding to the viewing region from a plurality of light emission control patterns set for a plurality of light emission control regions, and
wherein the plurality of light emission control regions are set for each of the plurality of pieces of the content.

15. The information processing device according to claim 14,
wherein the user views a first piece of the content among the plurality of pieces of the content,
wherein the at least one processor is further configured to:
determine the first piece of the content; and
select the light emission control region and the light emission control pattern for the first piece of the content.

16. The information processing device according to claim 15, wherein the at least one processor is further configured to determine the first piece of the content based on a user input on the content.

17. The information processing device according to claim 1, wherein at least one processor is further configured to:
set a plurality of light emission control regions for a plurality of users,
wherein the plurality of users include the user; and
adjust mutually competitive light emission controls for the plurality of the light emission control regions.

18. An information processing method, comprising:
in an information processing device:
acquiring user information based on a state of a user who views a display region;
controlling, based on the acquired user information, light emission of a light emission control region around a content display region; and
specifying a viewing region in the display region based on at least one of information of a position of the user with respect to the display region or information of a line of sight of the user,
wherein the content display region displays content within the display region.

19. A non-transitory computer-readable medium having stored thereon, computer-executable instructions which, when executed by a processor, cause the processor to execute operations, the operations comprising:
acquiring user information based on a state of a user who views a display region;
controlling, based on the acquired user information, light emission of a light emission control region around a content display region; and
specifying a viewing region in the display region based on at least one of information of a position of the user with respect to the display region or information of a line of sight of the user,
wherein the content display region displays content within the display region.

* * * * *